US011467250B2

(12) United States Patent
Li

(10) Patent No.: US 11,467,250 B2
(45) Date of Patent: Oct. 11, 2022

(54) SCALABLE CASCADING RADAR SYSTEM

(71) Applicant: Aptiv Technologies Limited, St. Michael (BB)

(72) Inventor: Zhengzheng Li, Agoura Hills, CA (US)

(73) Assignee: Aptiv Technologies Limited, St. Michael (BB)

( * ) Notice: Subject to any disclaimer, the term of this patent is extended or adjusted under 35 U.S.C. 154(b) by 287 days.

(21) Appl. No.: 16/776,882

(22) Filed: Jan. 30, 2020

(65) Prior Publication Data
US 2021/0239787 A1 Aug. 5, 2021

(51) Int. Cl.
*G01S 7/03* (2006.01)
*G01S 7/282* (2006.01)
*G01S 13/931* (2020.01)
*H04B 7/0413* (2017.01)

(52) U.S. Cl.
CPC .............. *G01S 7/032* (2013.01); *G01S 7/282* (2013.01); *G01S 13/931* (2013.01); *H04B 7/0413* (2013.01)

(58) Field of Classification Search
CPC ........ G01S 7/032; G01S 7/282; G01S 13/931; G01S 13/343; H04B 7/0413
USPC .......................................................... 342/70
See application file for complete search history.

(56) References Cited

U.S. PATENT DOCUMENTS

| | | | | |
|---|---|---|---|---|
| 6,054,948 A * | 4/2000 | Dean | ...................... | G01S 7/032 342/372 |
| 6,441,783 B1 * | 8/2002 | Dean | ...................... | G01S 7/032 342/372 |
| 8,873,339 B2 * | 10/2014 | Chen | ...................... | H03K 5/15 342/464 |
| 9,002,290 B2 * | 4/2015 | Olgaard | ............. | H04B 17/0085 370/332 |

(Continued)

FOREIGN PATENT DOCUMENTS

| | | | |
|---|---|---|---|
| DE | 102017217805 | 4/2019 | |
| DE | 102017217805 A1 * | 4/2019 | ............. G01S 13/89 |
| DE | 102018200385 | 7/2019 | |

OTHER PUBLICATIONS

"Extended European Search Report", EP Application No. 20217341.5, Jun. 18, 2021, 17 pages.

(Continued)

*Primary Examiner* — Erin F Heard
*Assistant Examiner* — Michael W Justice
(74) *Attorney, Agent, or Firm* — Sawtooth Patent Group PLLC

(57) ABSTRACT

The techniques of this disclosure describe a scalable cascading automotive radar system that generates a common oscillator signal enabling consecutive chirps to be output more quickly and precisely than any previous cascading automotive radar system, thereby reducing phase noise and improving performance. The scalable cascading automotive radar system combines a respective LO signal output from at least two primary transceivers to distribute the combined (Continued)

signals as a common oscillator signal to be input to all the transceivers of the radar system. Thus, settling time and resetting times that otherwise occur between chirps generated by other automotive radar systems are reduced because the common oscillator signal is no longer constrained to a single LO signal from a single primary transceiver.

20 Claims, 20 Drawing Sheets

(56) References Cited

U.S. PATENT DOCUMENTS

| | | | | |
|---|---|---|---|---|
| 9,246,606 | B2* | 1/2016 | Olgaard | H04B 17/29 |
| 9,261,587 | B1* | 2/2016 | Gwinn, IV | G01S 7/03 |
| 10,422,870 | B2* | 9/2019 | Mindell | G01S 7/285 |
| 10,598,767 | B2* | 3/2020 | Subburaj | G01S 7/4004 |
| 10,746,863 | B2* | 8/2020 | Hoshuyama | G01S 7/536 |
| 11,047,957 | B2* | 6/2021 | Mikhailov | G06N 3/088 |
| 11,199,616 | B1* | 12/2021 | Pond | H01Q 25/04 |
| 11,221,395 | B2* | 1/2022 | Mokhtari | G01S 13/931 |
| 11,235,777 | B2* | 2/2022 | Ibrahim | G08G 1/167 |
| 2013/0301694 | A1* | 11/2013 | Olgaard | H04B 7/0413 375/224 |
| 2014/0043104 | A1* | 2/2014 | Chen | H03K 5/15 331/46 |
| 2015/0180591 | A1* | 6/2015 | Olgaard | H04B 17/29 375/224 |
| 2017/0016983 | A1* | 1/2017 | Hoshuyama | G01S 15/34 |
| 2017/0090014 | A1* | 3/2017 | Subburaj | G01S 7/4052 |
| 2018/0024233 | A1 | 1/2018 | Searcy et al. | |
| 2018/0172813 | A1* | 6/2018 | Rao | G01S 13/931 |
| 2018/0239010 | A1* | 8/2018 | Mindell | G01S 7/352 |
| 2018/0257660 | A1* | 9/2018 | Ibrahim | G01C 21/30 |
| 2018/0293784 | A1 | 10/2018 | Benthin et al. | |
| 2019/0154797 | A1* | 5/2019 | Subburaj | G01S 7/032 |
| 2019/0293784 | A1* | 9/2019 | Khalid | G01S 13/343 |
| 2019/0361109 | A1* | 11/2019 | Mindell | G01S 11/02 |
| 2019/0377075 | A1* | 12/2019 | Tsfati | H04B 17/27 |
| 2020/0132810 | A1* | 4/2020 | Subburaj | G01S 7/40 |
| 2020/0158823 | A1* | 5/2020 | Mikhailov | G01S 7/417 |
| 2021/0048508 | A1* | 2/2021 | Mokhtari | H01P 1/202 |

OTHER PUBLICATIONS

M. Steinhauer, H.-O. Ruob, H. Irion, and W. Menzel,"Millimeterwave-radar sensor based on a transceiver array for automotive applications," IEEE Trans. Microw. Theory Techn., vol. 56, No. 2, pp. 261269, Feb. 2008.

R. Feger, C. Wagner, S. Schuster, S. Scheiblhofer, H. Jager, and A. Stelzer, "A 77-GHz FMCW MIMO radar based on an SiGe singlechip transceiver," IEEE Trans. Microw. Theory Techn., vol. 57, No. 5, pp. 10201035, May 2009.

C. Pfeffer, R. Feger, C. Wagner, and A. Stelzer, "FMCW MIMO radar system for frequency-division multiple TX-beamforming," IEEE Trans. Microw. Theory Techn., vol. 61, No. 12, pp. 42624274, Dec. 2013.

Proceedings of 2018 Asia-Pacific Micrewave Conference, pp. 1235-1237, A Scalable 77 GHz Massive MIMO FMCW Radar by Cascading Fully-Integrated Transceivers, Andreas Och.

2019 IEEE/MTT-S International Microwave Symposium, pp. 690-693, A 79-GHz Scalable FMCW MIMO Automotive Radar Transceiver Architecture with Injection-Locked Synchronization, Ahmad Mushtaq.

Texas Instruments Application Report, AWR1243 Cascade, SWRA574A—Oct. 2017—Revised Dec. 2017.

H. Ng, R. Hasan, D. Kissinger, A Scalable Four-Channel Frequency-Division Multiplexing MIMO Radar Utilizing Single-Sideband DeltaSigma Modulation", IEEE Transactions on Microwave Theory and Techniques. In Press."

* cited by examiner 606-1

SCALABLE CASCADING RADAR SYSTEM

BACKGROUND

An automotive radar system collects information about the speed and distance of stationary and moving targets (e.g., other vehicles, pedestrians, obstacles, other objects of interest) located outside an automobile. With multiple transceivers and an ability to transmit and process more independent and distinct signals simultaneously, a multiple-input multiple-output (MIMO) radar system can collect large amounts of radar information quickly, which is suited for collision avoidance and other active safety or autonomous-driving features of the automobile. Unfortunately, MIMO radar systems are typically greater in size and cost due to their increased complexity.

Cascade radar systems are forms of MIMO radar systems that minimize complexity (and therefore size and cost) by operating all the transceivers according to a primary local oscillator (LO) signal. The primary LO signal is used for both up-conversions and down-conversions in the transceiver. If the primary LO signal is a modulated signal, it is also used to modulate the radar transmit signal and demodulate the radar receive signal. Only one transceiver is designated a "primary" transceiver making that transceiver responsible for generating the primary LO signal and for itself and all other "secondary" transceivers. The chirp length and bandwidth of the cascaded radar system are limited by constraints (e.g., settling time, resetting time) associated with the primary LO signal, causing an undesirable delay between the end of a current chirp and the start of a next chirp.

SUMMARY

The techniques of this disclosure enable scalable cascading radar systems (e.g., for automotive applications) that are not limited by constraints (e.g., settling time and resetting time) of a single LO signal used in a traditional cascading radar system. Instead, an example scalable cascading radar system is described that combines multiple LO signals output from at least some of the multiple transceivers of the radar system and distributes a common oscillator signal derived from the combination of LO signals as the LO signal input to all of the transceivers of the radar system. This common oscillator signal reduces settling time and resetting time of a traditional LO signal in a cascaded radar system, and therefore enables consecutive chirps to occur more frequently. The common oscillator signal, having been created from a combination of LO signals of multiple transceivers, addresses the settling time and resetting time issues that prevent fast-chirp waveforms when only a single primary transceiver is used. The common oscillator signals enable the generation of additional chirp waveforms with different characteristics, such as center frequency and bandwidth, to improve range resolution and Doppler coverage. Different waveforms enable the cascading radar system to achieve waveform diversity, making the cascading radar system more versatile and able to detect additional types of targets that otherwise go undetected unless particular waveforms are used. The common oscillator signal of the example cascading radar system further enables better orthogonality among transmit (TX) channels and more robust protection from interference.

In some aspects, a scalable cascading automotive radar system is described including: a plurality of transceivers including a first transceiver and a second transceiver each configured to output a respective local oscillator (LO) signal; a combiner configured to merge the respective LO signal that is output from the first transceiver with the respective LO signal that is output from the second transceiver into a common oscillator signal; a divider configured to distribute the common oscillator signal to each of the plurality of transceivers when the transceivers are emitting radar signals for detecting radar reflections from targets outside an automobile; and a radar control component configured to output information associated with the radar reflections detected from the radar signals that reached the targets outside the automobile.

In other aspects, a scalable cascading automotive radar system is described including: a plurality of transceivers each capable of outputting a respective local oscillator (LO) signal; a combiner configured to merge the respective LO signal that is output from at least two of the plurality of transceivers into a common oscillator signal; a divider configured to distribute the common oscillator signal to each of the plurality of transceivers when the transceivers are emitting radar signals for detecting radar reflections from targets outside an automobile; and a radar control component configured to output information about the radar reflections that reached the targets outside the automobile.

In additional aspects, a method includes obtaining, from each of at least two transceivers of a scalable cascading automotive radar system, a respective local oscillator (LO) signal; generating, based on a combination of the respective LO signals output from the at least two transceivers, a common oscillator signal for input to the at least two transceivers when the at least two transceivers are emitting radar signals for detecting radar reflections from targets outside an automobile; and inputting the common oscillator signal into a respective LO signal input of each of the at least two transceivers when the at least two transceivers are emitting the radar signals for detecting the radar reflections from the targets outside the automobile.

This document also describes computer-readable media having instructions for performing the above-summarized method. Other methods are set forth herein, as well as systems and means for performing the above-summarized and these other methods. This summary is provided to introduce simplified concepts for scalable cascading automotive radar systems, which is further described below in the Detailed Description and Drawings. For ease of description, the disclosure focuses on automotive radar systems; however, the techniques are not limited to automobiles, but apply to radars of other types of vehicles and systems. This summary is not intended to identify essential features of the claimed subject matter, nor is it intended for use in determining the scope of the claimed subject matter.

BRIEF DESCRIPTION OF THE DRAWINGS

The details of one or more aspects of scalable cascading radar systems are described in this document with reference to the following drawings. The same numbers are used throughout the drawings to reference like features and components:

FIG. 4-1 illustrates transmitting portions of an example antenna array and an example transceiver of a scalable cascading radar system.

FIG. 4-2 illustrates receiving portions of an example antenna array and an example transceiver of a scalable cascading radar system.

FIG. 4-3 illustrates an example scheme implemented by a processor of a scalable cascading radar system.

FIGS. 4-4 and 4-5 each illustrate an example of a local oscillator of the example transceiver of FIG. 4-1.

FIGS. 5-1 and 5-2 illustrate examples of a traditional cascading radar system.

FIG. 5-3 illustrates a waveform showing timing limitations of a traditional cascading radar system.

FIG. 6-1 illustrates an example of a scalable cascading radar system.

FIG. 6-2 illustrates aspects of the scalable cascading radar system in FIG. 6-1.

FIG. 6-3 illustrates a waveform showing timing benefits of a scalable cascading radar system.

FIGS. 7-1 through 7-4 illustrate example transceiver architectures for a scalable cascading radar system.

DETAILED DESCRIPTION

The details of one or more aspects of a scalable cascading automotive radar system are described below. Advanced driver-assistance systems, highly-automated driving systems, as well as other subsystems, demand accurate knowledge of the surrounding environment of the vehicle. Automotive radars, which provide direct estimates of range, velocity, and angle information, have quickly become one of the vital sensing technologies of which these automotive subsystems rely for acquiring critical information of the environment.

To achieve a high angular resolution while maintaining a wide coverage, automotive radars are more and more often MIMO radar systems that can generate virtual channels and greatly reduce the number of physical TX and physical RX (receiving) channels. MIMO radar systems process information provided by different TX and RX channel combinations. For example, a MIMO automotive radar system with 3RX and 4TX channels can emulate the performance of a system with 1TX and 12RX channels. However, a MIMO automotive radar is often large, complex, and expensive. The recent development of fully-integrated transceivers on Monolithic Microwave Integrated Circuits (MMIC) has drastically reduced the cost and complexity of a MIMO radar system. Multiple TX and RX channels, as well as analog and digital front-ends, are integrated into a single chip. The popular MMIC transceivers, with their small size and low cost, only support a limited number of TX and RX channels. Scaling a MIMO radar system to include more MMIC transceivers improves angular resolution, but with some drawbacks, including uncorrelated phase noise of individual LO signals being input into each of the different transceivers.

In contrast to these previous MIMO radar systems, this document describes a scalable cascading automotive radar system that generates a common oscillator signal enabling consecutive chirps to be output more quickly and precisely than any previous cascading automotive radar system, which reduces phase noise and improves performance. The scalable cascading automotive radar system combines a respective LO signal output from at least two primary transceivers to distribute the combined signals as a common oscillator signal to be input to all the transceivers of the radar system. Thus, settling time and resetting times that otherwise occur between chirps generated by other automotive radar systems are reduced because the common oscillator signal is no longer constrained to a single LO signal from a single primary transceiver.

Example Environment

Figure 1:
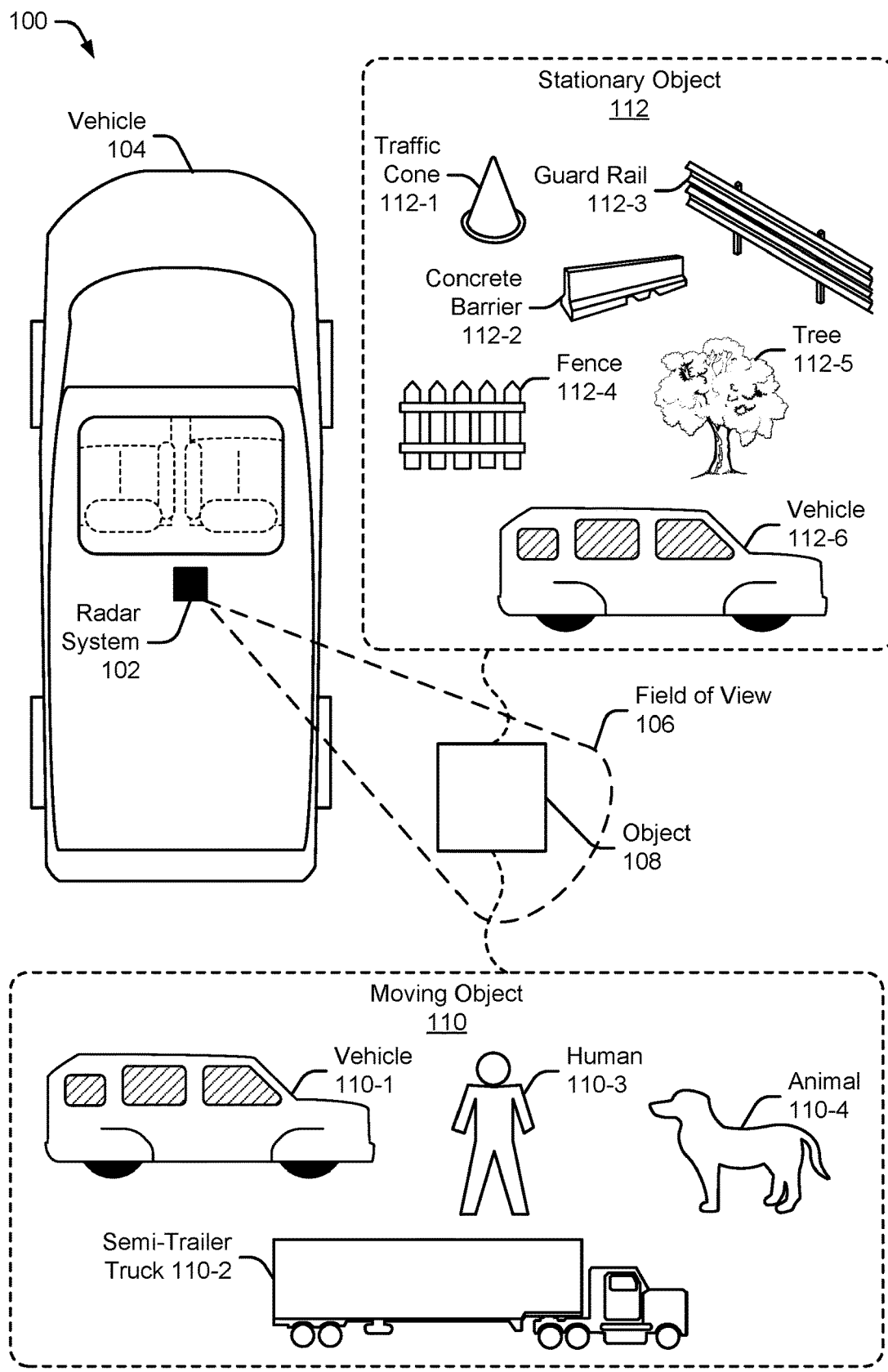
FIG. 1 illustrates an example environment in which a scalable cascading radar system can be implemented.

FIG. 1 illustrates an example automobile system, including a scalable cascading automotive radar system 102. In the depicted environment 100, the radar system 102 is mounted to, or integrated within, a vehicle 104. The radar system 102 is capable of detecting one or more objects 108 that are within proximity to the vehicle 104. Although illustrated as a car, the vehicle 104 can represent other types of motorized vehicles (e.g., a motorcycle, a bus, a tractor, a semi-trailer truck, or construction equipment), types of non-motorized vehicles (e.g., a bicycle), types of railed vehicles (e.g., a train or a trolley car), watercraft (e.g., a boat or a ship), aircraft (e.g., an airplane or a helicopter), or spacecraft (e.g., satellite). In some cases, the vehicle 104 can tow or include a trailer or other attachments. In general, the radar system 102 can be mounted to any type of moving platform, including moving machinery or robotic equipment.

In the depicted implementation, the radar system 102 is mounted on top of the vehicle 104 and provides a field of view 106 illuminating an object 108. In other implementations, the radar system 102 can be mounted to a front side, a backside, a left side, or a right side of the vehicle 104. The radar system 102 may even be mounted on the underside of the vehicle 104. In some cases, the vehicle 104 includes multiple radar systems 102, such as a first rear-mounted radar system 102 positioned near a left side of the vehicle 104 and a second rear-mounted radar system 102 positioned near a right side of the vehicle 104. In general, locations of the one or more radar systems 102 can be designed to provide a particular field of view 106 that encompasses a region of interest in which the object 108 may be present. Example fields of view 106 include a 360-degree field of view, one or more 180-degree fields of view, one or more 90-degree fields of view, and so forth, which can overlap (e.g., for creating a particular size field of view).

The object 108 is composed of one or more materials that reflect radar signals. Depending on the application, the object 108 can represent a target of interest or clutter. In some cases, the object 108 is a moving object 110, such as another vehicle 110-1, a semi-trailer truck 110-2, a human 110-3, or an animal 110-4. In other cases, the object 108 represents a stationary object 112, such as traffic cone 112-1, a concrete barrier 112-2, a guard rail 112-3, a fence 112-4, a tree 112-5, or a parked vehicle 112-6. The stationary object 112 may even comprise a road barrier, which can be continuous or discontinuous along a portion of the road. The radar system 102 and the vehicle 104 are further described with respect to FIG. 2.

In general, the radar system 102 is a MIMO radar system configured to distribute a common oscillator signal based on a combination of LO signals from at least two transceivers of the radar system 102. The radar system derives a common oscillator signal based on a combination of the respective LO signals, then passes the common oscillator signal into each of the transceivers of the radar system 102 for emitting radar signals. Unlike a traditional cascading automotive radar system, the scalable cascading radar system 102 is not limited by constraints of a single primary transceiver system, such as a delay between chirps caused by settling time and delay from a single primary transceiver outputting the LO signal that cascades to all the transceivers. The radar system 102 allows multiple transceivers 104 to be configured as primary transceivers and enables LO signals generated from the multiple primary transceivers to be combined and used by all transceivers at the same time. Having LO signals generated from multiple primary transceivers not only addresses settling time and resetting time issue that otherwise prevents fast chirp waveforms from a single LO signal, but also makes possible other waveforms that improve range resolution and are more robust to interference.

Figure 2:
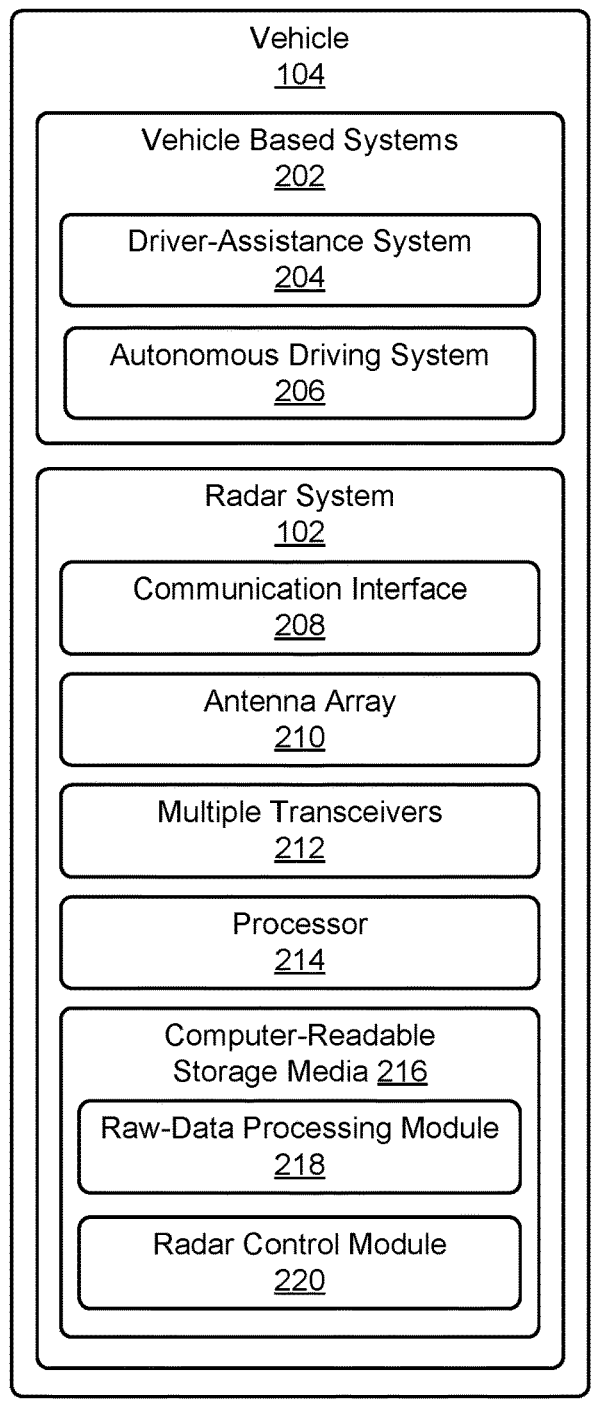
FIG. 2 illustrates an example implementation of a scalable cascading radar system as part of a vehicle.

FIG. 2 illustrates the radar system 102 as part of the vehicle 104. The vehicle 104 includes vehicle based systems 202 that rely on data from the radar system 102, such as a driver-assistance system 204 and/or an autonomous driving system 206. Generally, the vehicle based systems 102 use radar data provided by the radar system 102 to perform a function. For example, the driver-assistance system 204 provides blind-spot monitoring and generates an alert that indicates a potential collision with an object 108 that is detected by the radar system 102. In this case, the radar data from the radar system 102 indicates when it is safe or unsafe to change lanes.

As another example, the driver-assistance system 204 suppresses alerts responsive to the radar system 102 indicating that the object 108 represents a stationary object 112, such as a road barrier. In this way, the driver-assistance system 204 can avoid annoying the driver with alerts while the vehicle 104 is driving next to the road barrier. This can also be beneficial in situations in which reflections from the road barrier generate false detections that appear to be moving objects. By suppressing the alerts, these false detections will not cause the driver-assistance system 204 to alert the driver.

The autonomous driving system 206 may move the vehicle 104 to a particular location while avoiding collisions with other objects 108 detected by the radar system 102. The radar data provided by the radar system 102 can provide information about the location and movement of the other objects 108 to enable the autonomous driving system 206 to perform emergency braking, perform a lane change, or adjust the vehicle 104's speed.

The radar system 102 includes a communication interface 208 to transmit the radar data to the vehicle based systems 202 or to another component of the vehicle 104 over a communication bus of the vehicle 104, for example, when the individual components shown in the radar system 102 are integrated within the vehicle 104. In general, the radar data provided by the communication interface 208 is in a format usable by the vehicle based systems 202. In some implementations, the communication interface 208 may provide information to the radar system 102, such as the speed of the vehicle 104 or whether a turning blinker is on or off. The radar system 102 can use this information to appropriately configure itself. For example, the radar system 102 can determine an absolute speed of the object 108 by compensating for the speed of the vehicle 104. Alternatively, the radar system 102 can dynamically adjust the field of view 106 based on whether a right-turning blinker or a left-turning blinker is on.

The radar system 102 also includes at least one antenna array 210 and multiple transceivers 212 to transmit and receive radar signals. The antenna array 210 includes multiple transmit antenna elements and multiple receive antenna elements to configure the radar system 102 as a MIMO capable of transmitting multiple distinct waveforms at a given time (e.g., a different waveform per transmit antenna element). The antenna elements can be circularly polarized, horizontally polarized, vertically polarized, or a combination thereof.

Using the antenna array 210, the radar system 102 can form beams that are steered or un-steered, and wide or narrow. The steering and shaping can be achieved through analog beamforming or digital beamforming. The one or more transmitting antenna elements can have an un-steered omnidirectional radiation pattern, or the one or more transmitting antenna elements can produce a wide steerable beam to illuminate a large volume of space. To achieve target angular accuracies and angular resolutions, the receiving antenna elements can be used to generate hundreds of narrow steered beams with digital beamforming. In this way, the radar system 102 can efficiently monitor an external environment and detect one or more objects 108 within a region of interest.

The transceivers 212 include circuitry and logic for transmitting and receiving radar signals via the antenna array 210. Components of the transceiver 212 can include amplifiers, mixers, switches, analog-to-digital converters, or filters for conditioning the radar signals. The transceiver 212 also includes logic to perform in-phase/quadrature (I/Q) operations, such as modulation or demodulation. A variety of modulations can be used, including linear frequency modulations, triangular frequency modulations, stepped frequency modulations, or phase modulations. The transceiver 212 can be configured to support continuous-wave or pulsed radar operations.

A frequency spectrum (e.g., range of frequencies) that the transceiver 212 uses to generate the radar signals can encompass frequencies between one and four hundred gigahertz (GHz), between four and one hundred GHz, or between approximately seventy and eighty GHz. The bandwidths can be less than one GHz, such as between approximately three hundred megahertz (MHz) and five hundred MHz.

The radar system 102 also includes one or more processors 214 and computer-readable storage media (CRM) 216. The CRM 216 includes a raw-data processing module 218 and a radar control module 220. The raw-data processing module 218 and the radar control module 220 can be implemented using hardware, software, firmware, or a combination thereof. In this example, the processor 214 executes instructions for implementing the raw-data processing module 218 and the radar control module 220. Together, the raw-data processing module 218 and the radar control module 220 enable the processor 214 to process responses from the receive antenna elements in the antenna array 210 to detect the object 108 and generate the radar data for the vehicle based systems 202.

The raw-data processing module 218 transforms raw data provided by the transceiver 212 into radar data that is usable by the radar control module 220. The radar control module 220 analyzes the radar data to map one or more detections. The radar control module 220 determines whether or not an object is present within the FOV 106 based on the quantity of consecutive frames with detections.

The radar control module 220 produces the radar data for the radar-based system 202. Example types of radar data include a Boolean value that indicates whether or not the object 108 is present within a particular region of interest, a number that represents a characteristic of the object 108

(e.g., position, speed, or direction of motion), a value that indicates the type of object 108 detected (e.g., a moving object 110 or a stationary object 112). The radar control module 220 configures the transceivers 212 to emit radar signals and detect reflections via the antenna array 210. The radar control module 306 outputs information associated with the radar reflections detected from radar signals that reach targets, such as the object 108.

Figure 3:
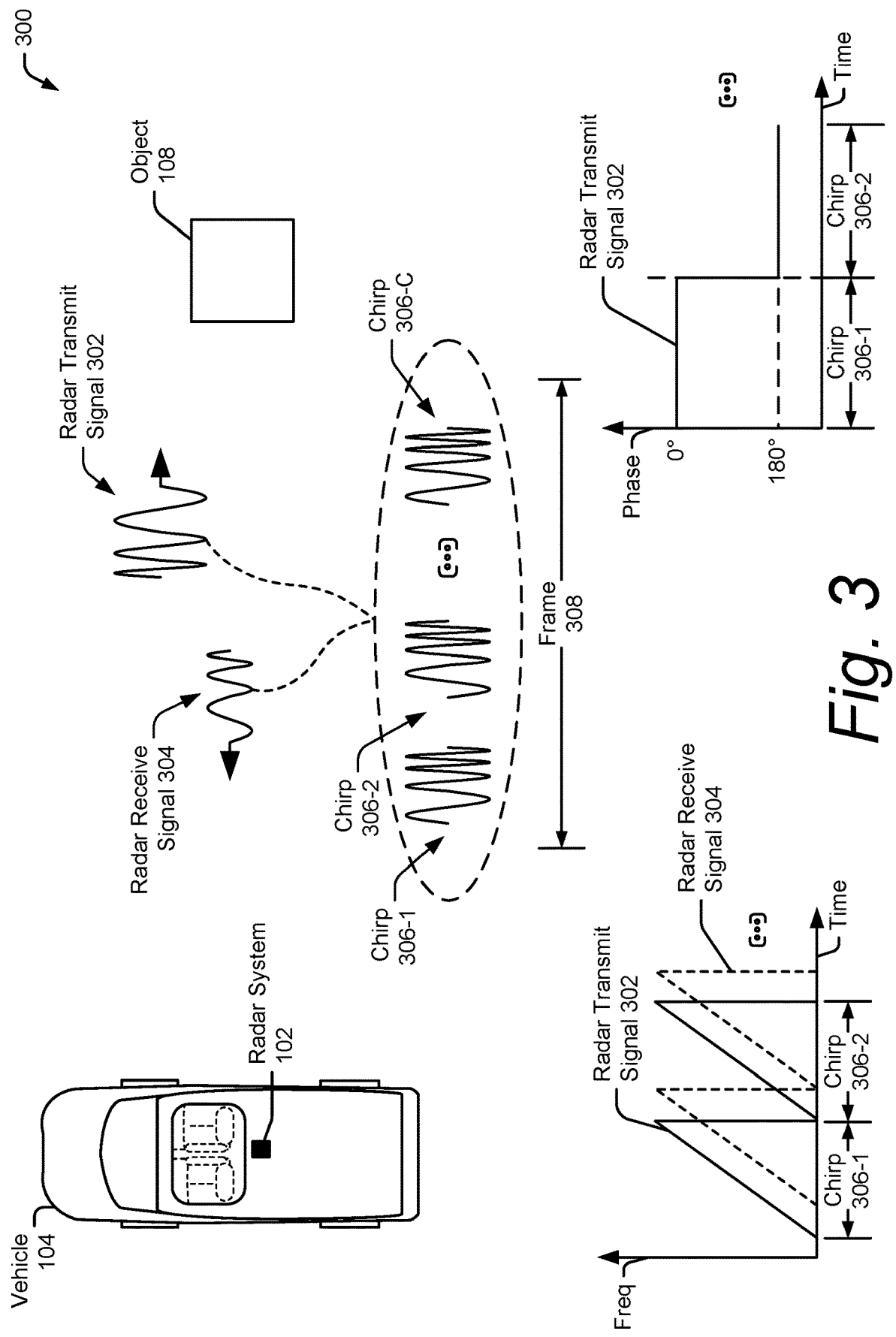
FIG. 3 illustrates an operation of an example scalable cascading radar system.

FIG. 3 illustrates an example operation of the radar system 102. In the depicted configuration, the radar system 102 is implemented as a frequency-modulated continuous-wave (FMCW) MIMO radar. However, other types of radar architectures can be implemented, as described above with respect to FIG. 2. In environment 300, the object 108 is located at a particular slant range and angle from the radar system 102. To detect the object 108, the radar system 102 transmits a radar transmit signal 302. At least a portion of the radar transmit signal 302 is reflected by the object 108. This reflected portion represents a radar receive signal 304. The radar system 102 receives the radar receive signal 304 and processes the radar receive signal 304 to extract data for the vehicle based system 202 (of FIG. 2). As depicted, an amplitude of the radar receive signal 304 is smaller than an amplitude of the radar transmit signal 302 due to losses incurred during propagation and reflection.

Although the radar transmit signal 302 is illustrated as having a single waveform, the radar transmit signal 302 can be composed of multiple radar transmit signals 302 that have distinct waveforms to support MIMO operations. Likewise, the radar receive signal 304 can be composed of multiple radar receive signals 302 that also have different waveforms.

The radar transmit signal 302 includes one or more chirps 306-1 to 306-C, where C represents a positive integer. The radar system 102 can transmit the chirps 306-1 to 306-C in a continuous sequence, or transmit the chirps 306-1 to 306-C as time-separated pulses. The chirps 306-1 to 306-C represent a frame 308 (or scan). The radar transmit signal 302 can include multiple frames 308, or multiple sets of chirps 306-1 to 306-C. As an example, a quantity of the chirps 306 within a frame 308 can be on the order of several hundreds of chirps (e.g., C can equal 256, 512, or 1024). A duration of the frame 308 can be on the order of milliseconds (ms), such as approximately 8 ms, 15 ms, or 30 ms.

Individual frequencies of the chirps 306-1 to 306-C can increase or decrease over time. In the depicted example, the radar system 102 employs a single-slope cycle to linearly increase the frequencies of the chirps 306-1 to 306-C over time. Other types of frequency modulations are also possible, including a two-slope cycle and/or a non-linear frequency modulation. In general, transmission characteristics of the chirps 306-1 to 306-C (e.g., bandwidth, center frequency, duration, and transmit power) can be tailored to achieve a particular detection range, range resolution, or Doppler coverage for detecting the object 108.

Additionally, the radar system 102 can employ a spread spectrum technique, such as code-division multiple access (CDMA), to support MIMO operations. In the depicted example, the radar system 102 uses binary phase-shift keying (BPSK) to encode each frame 308. For example, a coding sequence is applied to each frame 308 of the radar transmit signal 302. The coding sequence determines the phase of each one of the chirps 306-1 to 306-C within the frame 308. In this example, the second chirp 306-1 has a phase that is offset by one hundred eighty degrees from the phase of the first chirp 306-1.

At the radar system 102, the radar receive signal 304 represents a delayed version of the radar transmit signal 302. The amount of delay is proportional to the slant range (e.g., distance) from the antenna array 210 of the radar system 102 to the object 108. In particular, this delay represents a summation of a time it takes for the radar transmit signal 302 to propagate from the radar system 102 to the object 108 and a time it takes for the radar receive signal 304 to propagate from the object 108 to the radar system 102. If the object 108 and/or the radar system 102 is moving, the radar receive signal 304 is shifted in frequency relative to the radar transmit signal 302 due to the Doppler effect. In other words, characteristics of the radar receive signal 304 are dependent upon motion of the object 108 and/or motion of the vehicle 104. Similar to the radar transmit signal 302, the radar receive signal 304 is composed of one or more of the chirps 306-1 to 306-C. The multiple chirps 306-1 to 306-C enable the radar system 102 to make multiple observations of the object 108 over a time period of the frame 308. The transmission of the radar transmit signal 302 and the reception of the radar receive signal 304 are further described with respect to FIGS. 4-1 and 4-2, respectively.

Figures 1, 4:
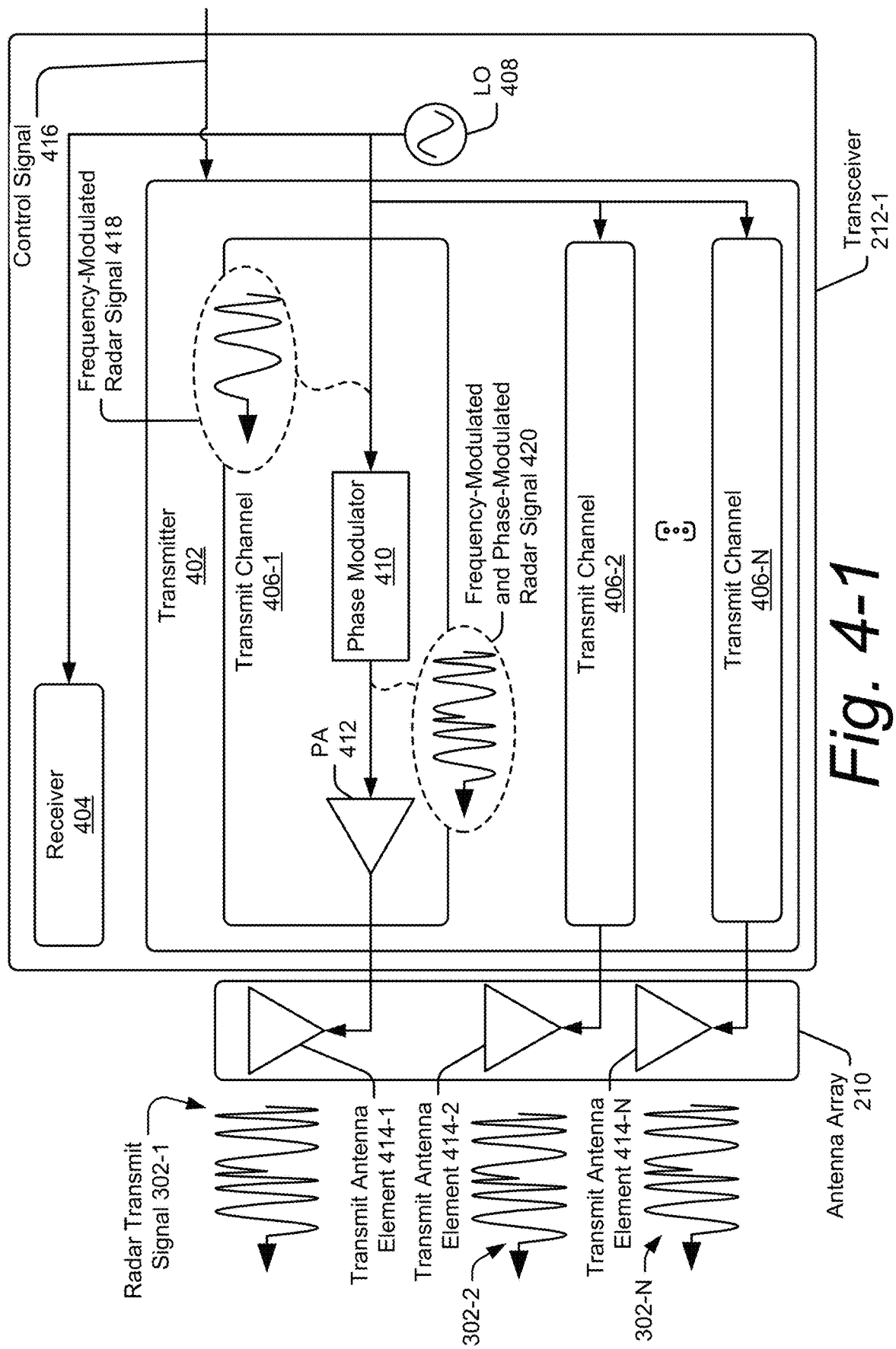
Figures 2, 4:
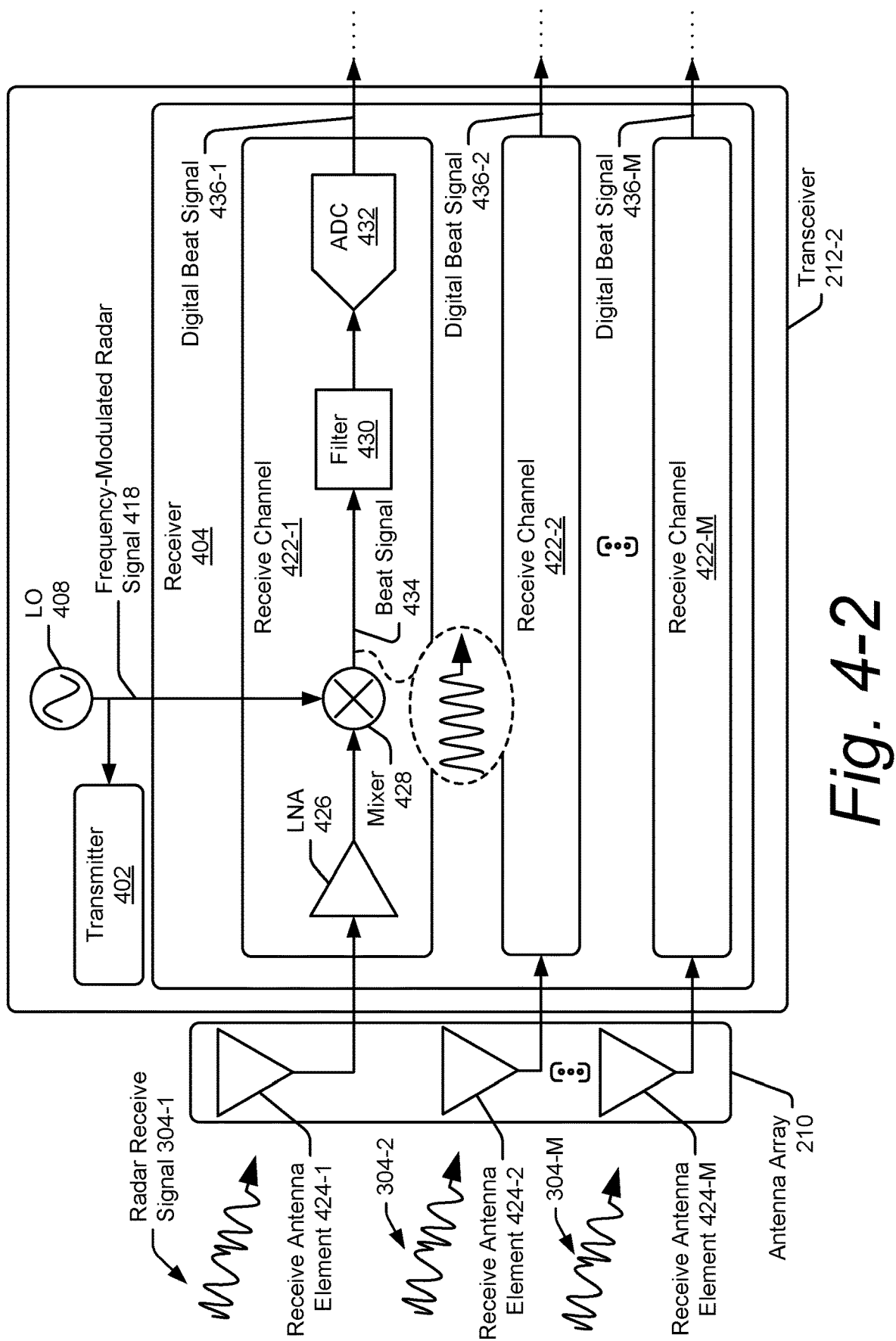
Figures 3, 4:
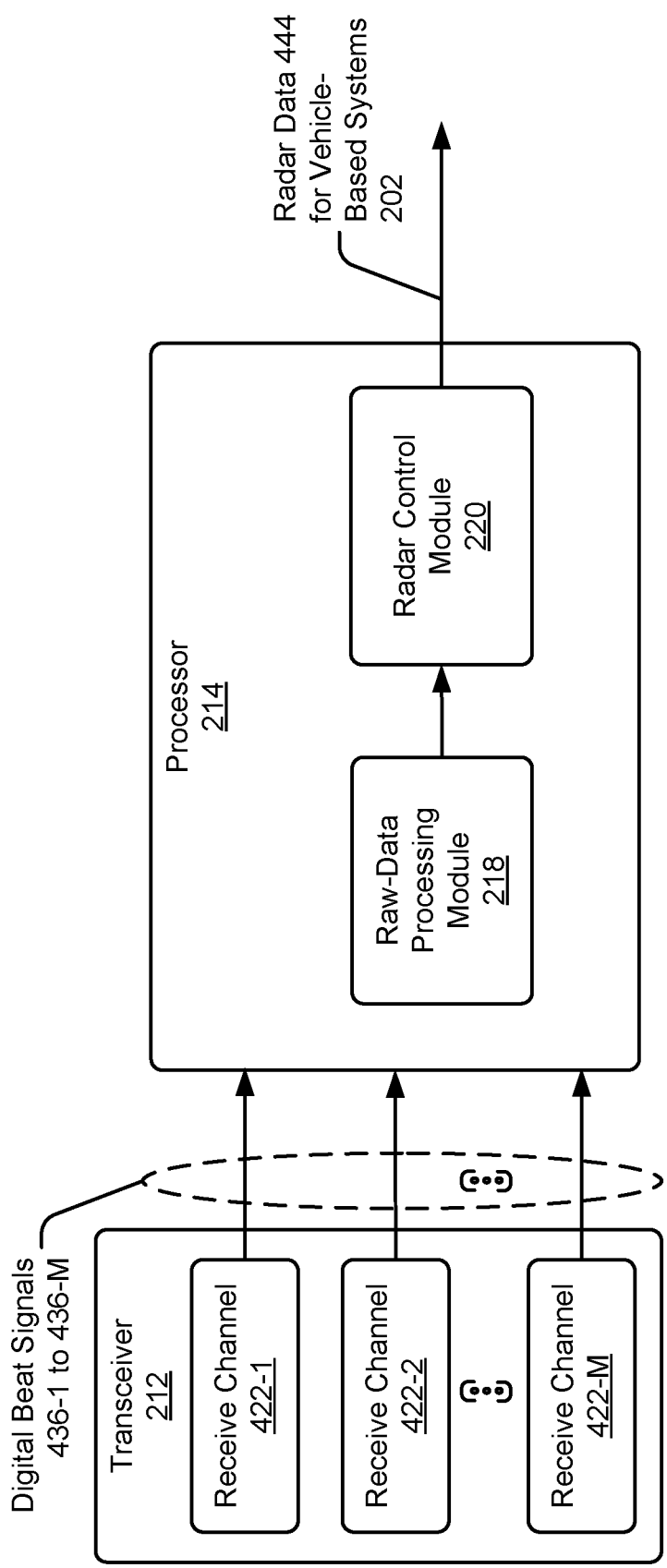
Figure 4:
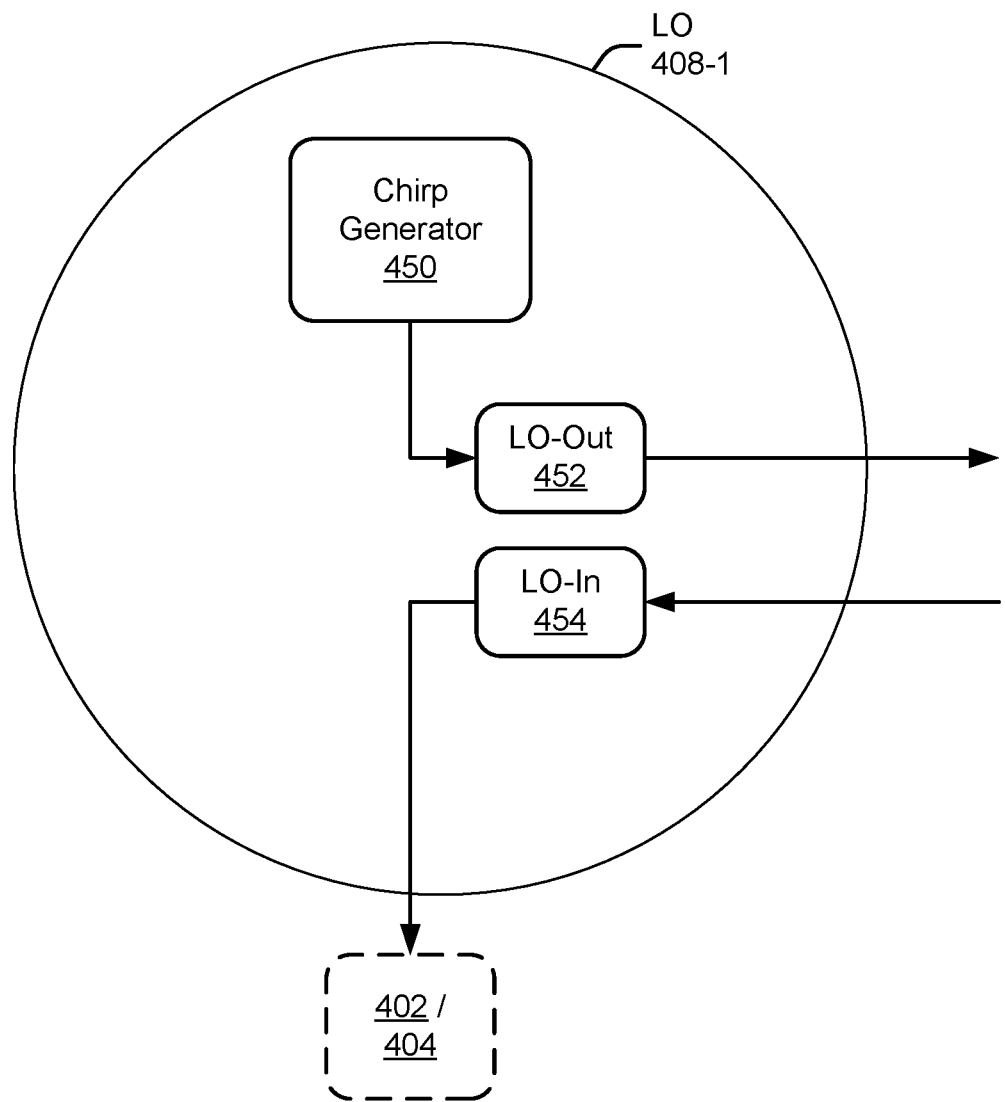

FIG. 4-1 illustrates transmitting portions of an example antenna array 210 and transceiver 212-1 as an example of the transceivers 212 of the radar system 102. In the depicted configuration, the transceiver 212-1 is coupled between the antenna array 210 and the processor 214 (of FIG. 2). The transceiver 212 includes a transmitter 402, which is coupled to a receiver 404. The transmitter 402 includes one or more transmit channels 406-1 to 406-N, where N is a positive integer.

Transmit channels 406 share a local oscillator 408, and each transmit channel 406 includes a phase modulator 410 and at least one power amplifier 412. In this example, the local controlled oscillator 408 produces the LO signal and is coupled to an input of the phase modulator 410, and an output of the phase modulator 410 is coupled to an input of the power amplifier 412. The receiver 404 is also coupled to the output of the local controlled oscillator 408, as further described with respect to FIG. 4-2. The transmit channels 406-1 to 406-N can also include other components not shown, such as filters, mixers, variable gain amplifiers, and phase shifters.

The antenna array 210 includes one or more transmit antenna elements 414-1 to 414-N. In this implementation, each one of the transmit channels 406-1 to 406-N is coupled to a respective transmit antenna element 414-1 to 414-N. In other implementations, one or more of the transmit channels 406-1 to 406-N are coupled to more than one of the transmit antenna elements 414-1 to 414-N. In this case, the quantity of transmit antenna elements 414-1 to 414-N is greater than the quantity of transmit channels 406-1 to 406-N.

During transmission, the transmitter 402 accepts a control signal 416 from the processor 214 (not shown). Using the control signal 416, the processor 214 directs the transmitter 402 to operate in a particular configuration or operational mode. As an example, the control signal 416 can specify types of waveforms generated by the transmit channels 406-1 to 406-N. Different waveform types can have various quantities of chirps (C), quantities of frames, chirp durations, frame durations, center frequencies, bandwidths, types of frequency modulation (e.g., a single-slope modulation, a two-slope modulation, a linear modulation, or a non-linear modulation), or types of phase modulations (e.g., different orthogonal coding sequences). Additionally, the control signal 416 can specify which transmit channels 406-1 to 406-N are enabled or disabled.

Based on the control signal 416, the voltage-controlled oscillator 408 of the transmit channel 406-1 generates a frequency-modulated radar signal 418 at radio frequencies. The phase modulator 410 modulates phases of the chirps 306-1 to 306-C within the frequency-modulated radar signal 418 to generate a frequency-modulated and phase-modulated radar signal 420. The phases of the chirps 306-1 to 306-C can be determined based on a coding sequence specified by the control signal 416. The power amplifier 412 amplifies the frequency-modulated and phase-modulated radar signal 420 for transmission via the transmit antenna element 414-1. The transmitted frequency-modulated and phase-modulated radar signal 420 is represented by a radar transmit signal 302-1.

Similar operations can be performed by the other transmit channels 406-2 to 406-N to generate the radar transmit signals 302-2 to 302-N. As described above, portions of the radar transmit signals 302-1 to 302-N can have similar waveforms or different waveforms. The radar transmit signals 302-1 to 302-N propagate through space, and portions of the radar transmit signals 302-1 to 302-N are reflected by at least one object 108 (of FIG. 3). The transceiver 212 receives these reflections, as further described with respect to FIG. 4-2.

FIG. 4-2 illustrates receiving portions of the antenna array 210 and the transceiver 212 of the radar system 102. In the depicted configuration, the receiver 404 includes one or more receive channels 422-1 to 422-M, where M represents a positive integer. The quantity of receive channels 422-1 to 422-M may be similar to or different than the quantity of transmit channels 406-1 to 406-N (e.g., M may be greater than, less than, or equal to N).

The receive channels 422 share the local oscillator 408. Each receive channel 422-1 to 422-M includes at least one low-noise amplifier 426, at least one mixer 428, at least one filter 430 (e.g., a band-pass filter or a low-pass filter), and at least one analog-to-digital converter 440. In this example, an input of the mixer 428 is coupled to an output of the low-noise amplifier 426, an output of the mixer 428 is coupled to an input of the filter 430, an output of the filter 430 is coupled to the analog-to-digital converter 440, and an output of the analog-to-digital converter 440 is coupled to the processor 214 (not shown). Another input of the mixer 428 is also coupled to the local controlled oscillator 408 shared by each of the transmit channels 406-1 to 406-N. The receive channels 422-1 to 422-M can also include other components (not shown), such as other filters, other mixers, variable gain amplifiers, phase shifters, and so forth.

The antenna array 210 includes one or more receive antenna elements 424-1 to 424-M. In this implementation, each one of the receive channels 422-1 to 422-M is coupled to a respective receive antenna element 424-1 to 424-M. In other implementations, one or more of the receive channels 422-1 to 422-M are coupled to more than one of the receive antenna elements 424-1 to 424-M. In this case, the quantity of receive antenna elements 424-1 to 424-M is greater than the quantity of receive channels 422-1 to 422-M.

During reception, each receive antenna element 424-1 to 424-M receives a version of the radar receive signal 304-1 to 304-M. In general, relative phase differences between these versions of the radar receive signals 304-1 to 304-M are due to differences in locations of the receive antenna elements 424-1 to 424-M and the transmit antenna elements of the transmitter 402 (e.g., transmitter antenna elements 414-1 to 414-n). Within each receive channel 422-1 to 422-M, the low-noise amplifier 426 amplifies the radar receive signal 304, and the mixer 428 mixes the amplified radar receive signal 304 with one of the frequency-modulated and phase-modulated radar signal 420 generated by one of the transmit channels 406-1 to 406-N of the transmitter 402. In particular, the mixer 428 performs a beating operation, which downconverts and demodulates the radar receive signal 304 to generate a beat signal 434.

A frequency of the beat signal 434 represents a frequency sum and difference between the frequency-modulated and phase-modulated radar signal 420 (e.g., the radar transmit signal 302) and the radar receive signal 304. This frequency difference is proportional to a slant range between the antenna array 210 and the object 108.

The filter 430 filters the beat signal 434, and the analog-to-digital converter 440 digitizes the filtered beat signal 434. The receive channels 422-1 to 422-M respectively generate digital beat signals 436-1 to 428-M, which are provided to the processor 214 (of FIG. 2) for processing. The receive channels 422-1 to 422-M of the transceiver 212 are coupled to the processor 214, as shown in FIG. 4-3.

FIG. 4-3 illustrates an example scheme implemented by the processor 214 of the radar system 102 for performing radar functions. In the depicted configuration, the processor 214 implements the raw-data processing module 218, and the radar control module 220 outputs radar data 444 for vehicle based systems 202. The processor 214 is connected to the receive channels 422-1 to 422-M.

During reception, the raw-data processing module 218 accepts the digital beat signals 436-1 to 428-M from the receive channels 422-1 to 422-M. The digital beat signals 436-1 to 428-M represent raw or unprocessed complex radar data. The raw-data processing module 218 performs one or more operations to generate a radar data cube 438 based on digital beat signals 436-1 to 428-M. As an example, the raw-data processing module 218 can perform one or more Fourier transform operations, such as a Fast Fourier Transform (FFT) operation. Over time, the raw-data processing module 218 generates multiple radar data cubes 438 for respective frames 308 of the radar receive signal 304.

The raw-data processing module 281 outputs amplitude and/or phase information (e.g., in-phase and/or quadrature components). The radar control module 220 analyzes information to generate radar data 444 for the vehicle based system 202. As an example, the radar data 444 indicates whether or not an object 108 is in a blind spot of the vehicle 104.

Figures 4, 5:
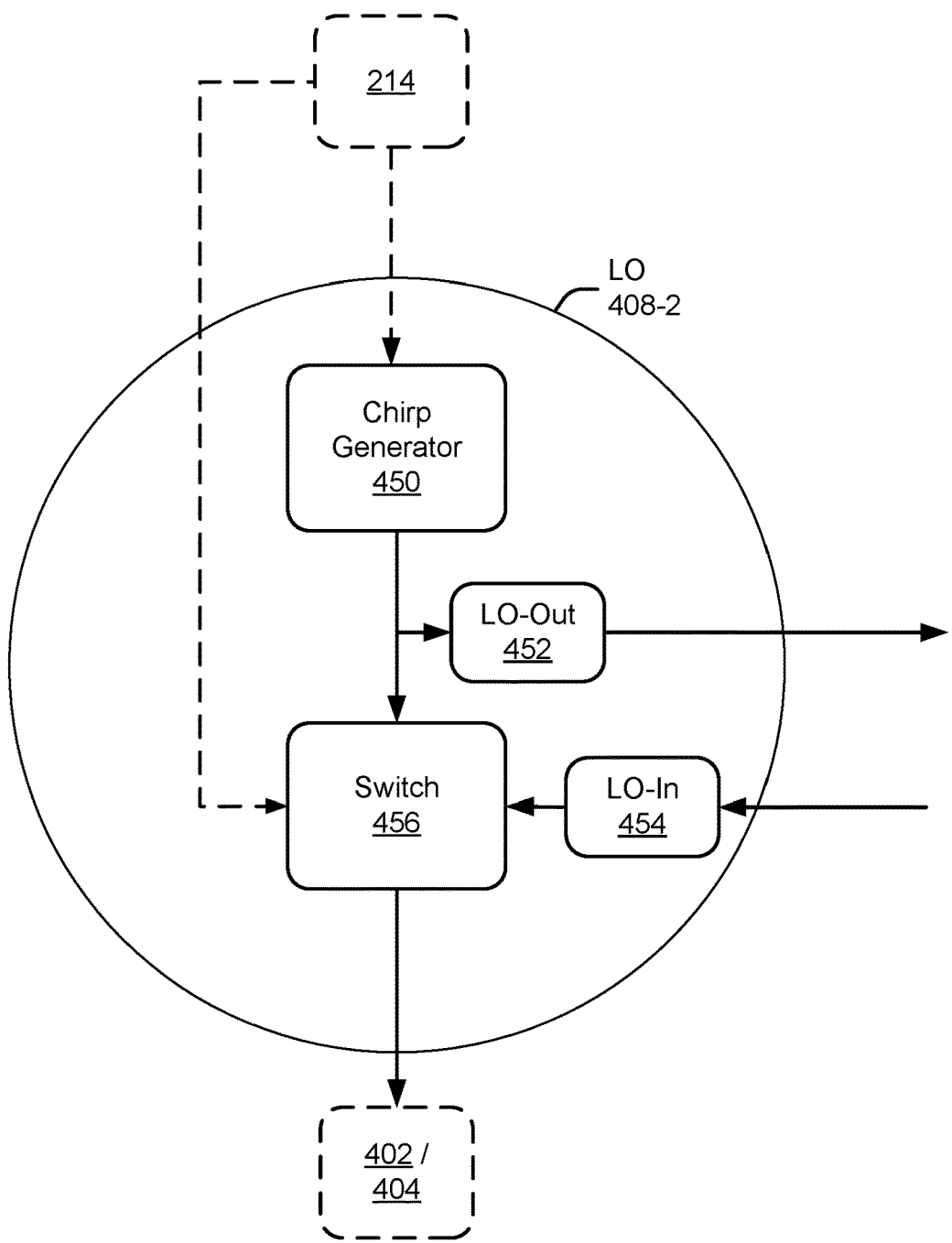
Figures 1, 5:
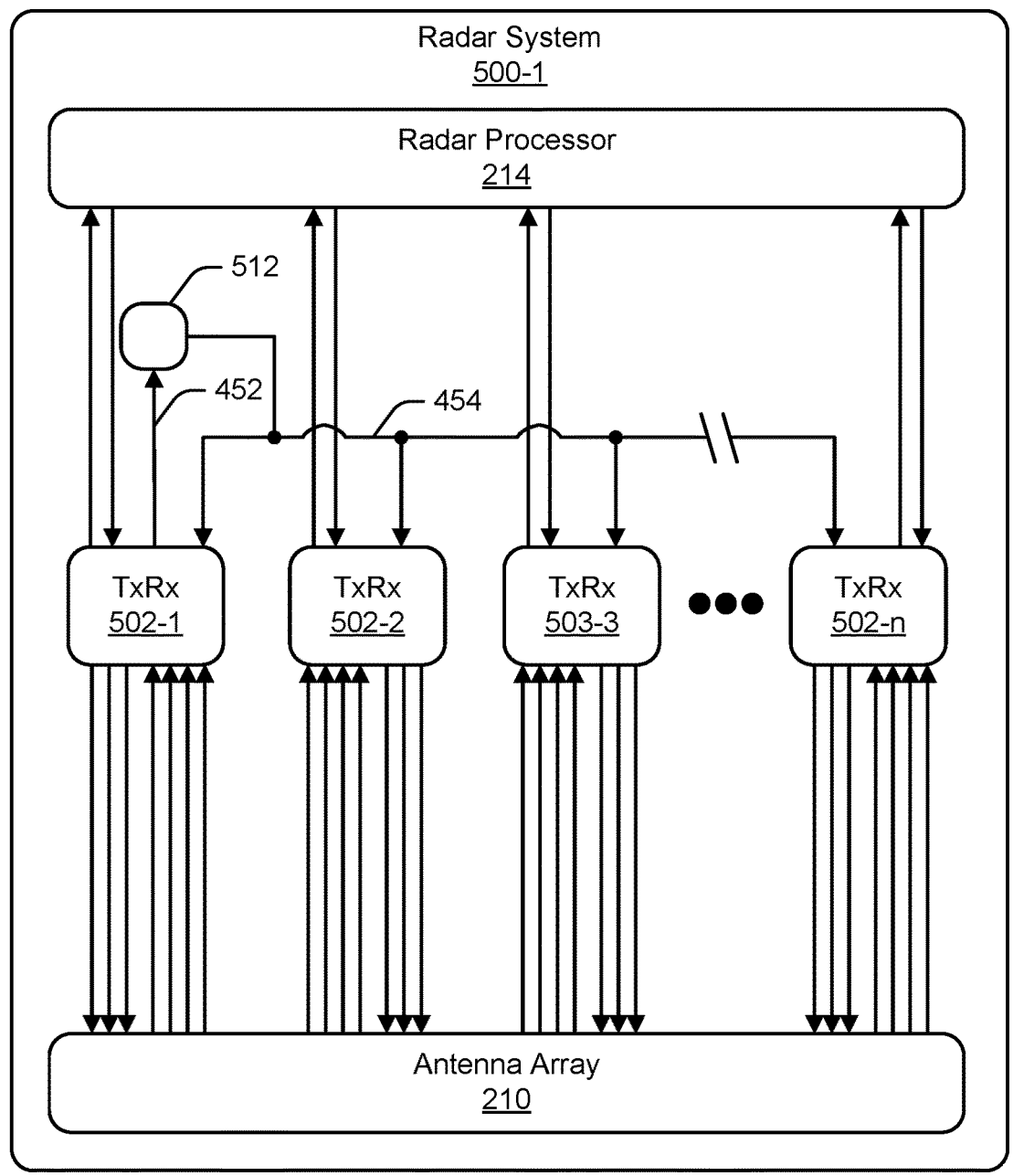
Figures 2, 5:
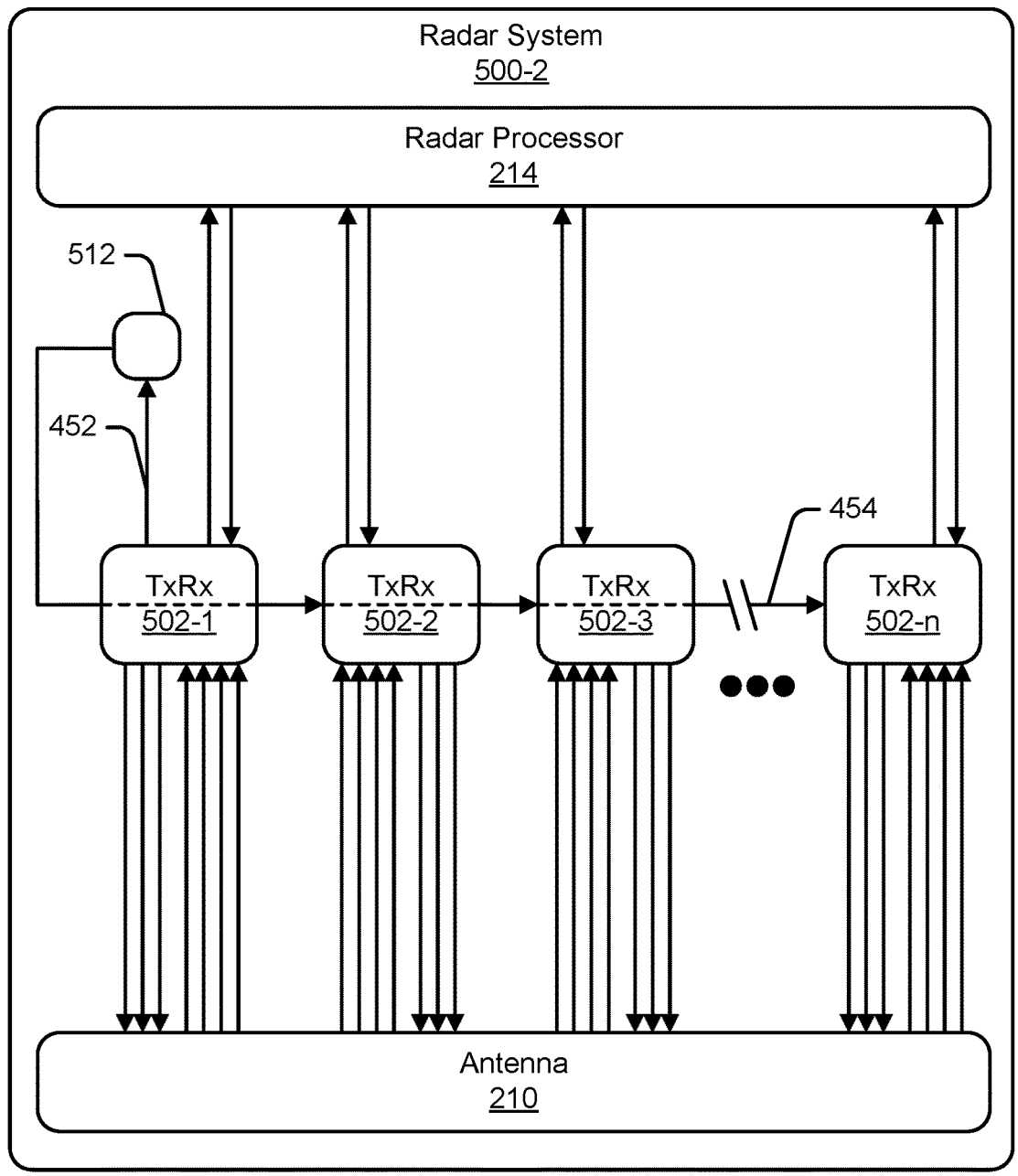
Figures 3, 5:
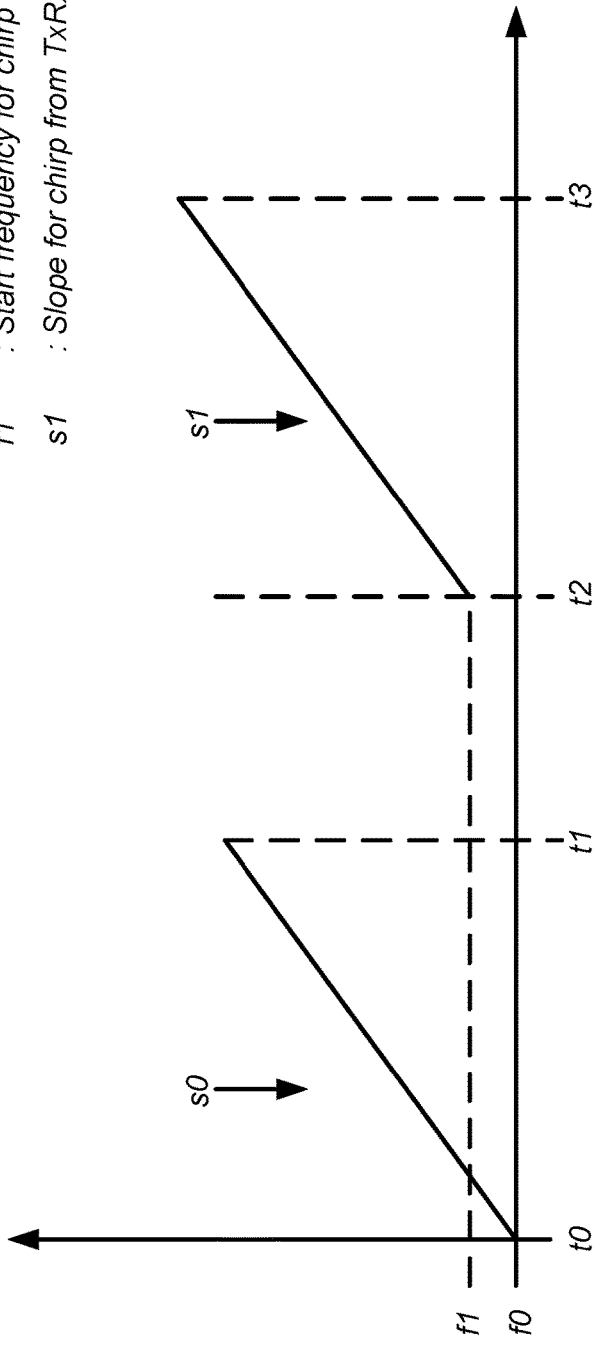

FIGS. 4-4 and 4-5 illustrate examples of the LO 408. The LO 408-1 includes a chirp generator 450 that is coupled to the LO-Out 452. The LO-In 454 of the LO 408-1 is the output coupled to the transceiver 402 and the receiver 404. The processor 214 can activate the chirp generator 450 to configure a transceiver as a primary transceiver that relies on the LO-Out 452. The processor 214 can disable the chirp generator 450 to configure a transceiver as a secondary transceiver that relies on the LO-In 454. In the example of FIG. 4-5 the processor 214 of the LO 408-2 can configure a transceiver as a primary transceiver by controlling a switch 456 that either connects the output of the chirp generator 450 to the phase modulator 410 or the switch 456 connects the LO-In signal 454 to the phase modulator 410.

In contrast to the LO 408-2, the LO 408-1 saves cost and weight without the switch 456. So the chirp generator 450, if active, outputs the LO signal from LO-Out 452 and inputs a LO signal (e.g., the common oscillator signal) to LO-In 454. Each of the LO 408-1 and 408-2 are configurable to output the LO-Out signal 452. In some cases, a manufacturer can save even more weight and cost providing a variant of the LO 408 that receives the LO-In signal 454 but omits the chirp generator 450, the switch 456, etc.

FIGS. 5-1 and 5-2 illustrate examples of a traditional cascading automotive radar system. Radar systems 500-1 and 500-2 each include the radar processor 214. Further, the radar systems 500-1 and 500-2 include transceivers 502, which are examples of transceivers 212. The radar processor 214 configures the transceivers 502-1 through 502-n to emit radar signals and detect reflections via the antenna array 210. The radar processor 214 outputs information associated with the radar reflections detected from radar signals that reach targets.

The radar systems 500-1 and 500-2 are identical cascading MIMO automotive radar systems except with respect to how the LO signal of each is shared from a primary transceiver 502-1 to each of the other secondary transceivers 502-2 through 502-n "transceivers 502", where n can be any integer. In single primary cascading systems such as these, the basic principle is to have multiple transceivers 502 working as one large integrated transceiver, where transceiver 502-1 is the only primary transceiver in charge of controlling timings of all the secondary transceivers 502-2 through 502-n. In other words, all the secondary transceivers 502-2 through 502-n are merely treated as extensions that add additional TX and RX channels. To ensure all the transceivers 502 behave like a single "virtual" transceiver, the LO signal is generated in the primary transceiver 502-1 (thus controlled by the primary transceiver only) and shared via amplifier or divider 512 with other secondary transceivers 502-2 through 502-n, in one of the two single primary cascading systems 500-1 and 500-2.

FIG. 5-3 illustrates a waveform 504 showing timing limitations of a traditional cascading MIMO automotive radar system, such as radar systems 500-1 and 500-2. Each of the two single cascading systems 500-1 and 500-2 generates the LO signal in the single transceiver 502-1, where the LO signal is output at LO-Out 452. A divider 512 supplies the LO signal to each transceiver 500's individual LO-In 454. The cascading systems 500-1 and 500-2 generate the LO signal at one transceiver 500-1 and share the LO signal either from a single distribution point (e.g., divider 312) or as a pass-through signal that passes through to the LO-In 254 of each other.

For example, as shown by the waveform 504, there is a considerable time delay (t2 minus t1) between a frequency-modulated chirp s0 produced by transceiver 502-1 and the frequency-modulated chirp s1 produced by the transceiver 502-2. As it is shown, after one frequency-modulated chirp, the LO signal needs time to reset and settle before the next frequency-modulated chirp can be generated, limiting how quickly frequency-modulated chirps can be transmitted. Due to these constraints of the LO signal, the length and bandwidth (BW) of a single chirp may be limited. Start frequency and slope for the second chirp may not be flexible and may require more settling or resetting time for the LO signal if there is too big of a difference in start frequencies (f1 minus f0) between two consecutive chirps. This delay between chirps impacts performance and prevents a continuous sequence of chirps from being emitted.

Figures 1, 6:
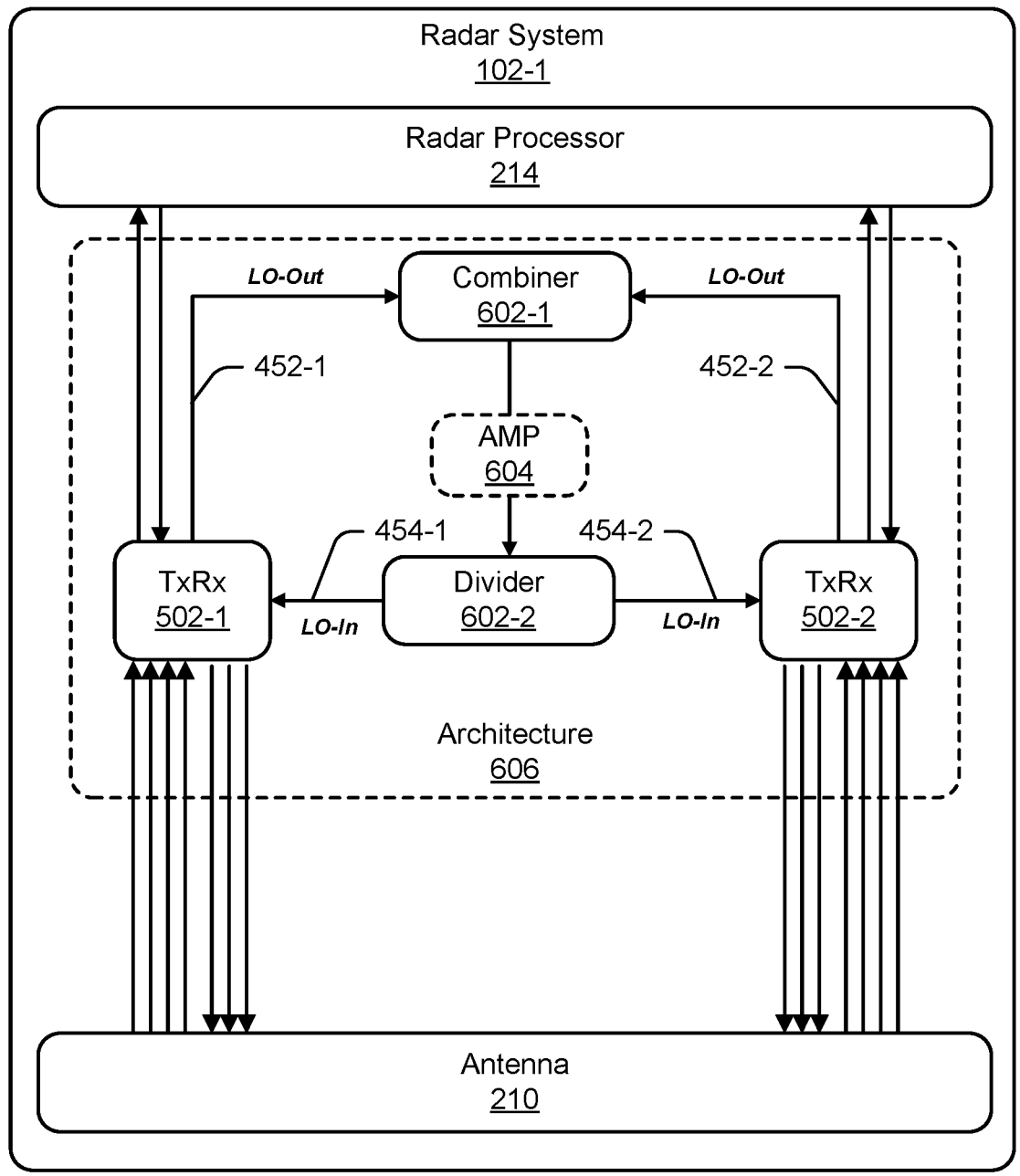
Figures 2, 6:
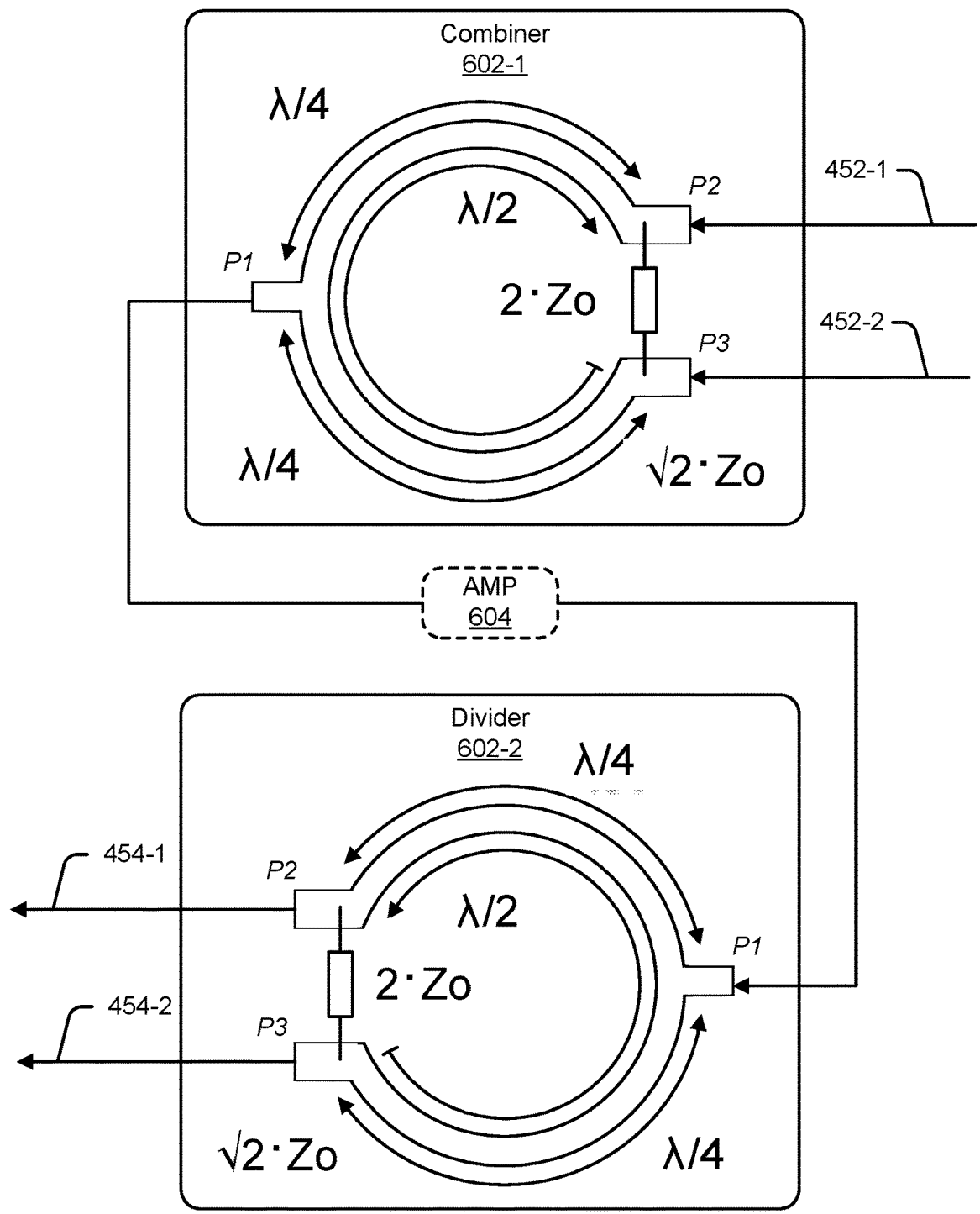
Figures 3, 6:
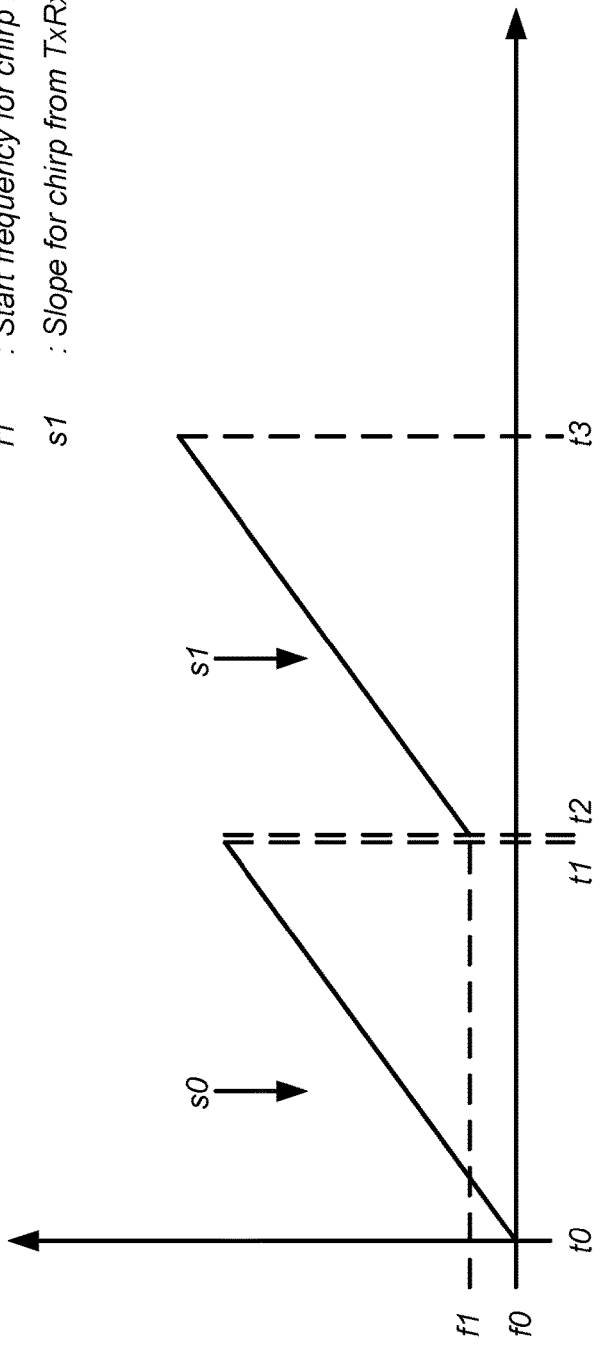

FIG. 6-1 illustrates an example of a scalable cascading MIMO automotive radar system 102-1. Radar system 102-1 includes the radar processor 214 and the antenna array 210. Unlike the traditional radar systems 500-1 and 500-2, which directly share the LO signal generated from the LO-Out 425 of a single primary transceiver, the radar system 102-1 includes transceiver architecture 606. A combiner 602-1 receives the LO signals 452-1 and 452-2 generated from multiple primary transceivers 502-1 and 502-2. Then, a divider 602-2 divides the common oscillator signal to meet the constraints of LO-In 454-1 and LO-In 454-2 being input to transceivers 502-1 through 502-2. The divider 602 may distribute an equal portion of the common oscillator signal to the respective LO-In 454-1 or 454-2 of each of the plurality of transceivers 502-1 and 502-2. In some cases, the transceiver architecture 606 includes one or more amplifiers 604, so the divided common oscillator signal output from the divider 602-2 satisfies the input constraints of the LO-In 454-1 and 454-2. The combiner 602-1 and the divider 602-2 rely on the amplifier 604 to increase the common oscillator signal to a threshold level (e.g., the voltage or current of the respective LO-In 218 required by the transceivers 302-1 and 302-2 for transmitting radar signals and detecting the radar reflections from the targets. The radar control component 402 outputs information associated with the radar reflections detected from radar signals that reach targets.

FIG. 6-2 illustrates aspects of the scalable cascading MIMO automotive radar system in FIG. 6-1. FIG. 6-2 shows the combiner 602-1 and the divider 602-2 in more detail. The 2-to-1 power combiner and the 1-to-2 power divider may be the same RF component, but feeding in the opposite direction. For example, as shown in FIG. 6-2, one option for the power combiner and divider 602-1 and 604-2 is the classic Wilkinson power divider, which promotes isolation between the respective LO-Outs 454-1 and 454-2 of transceivers 502-1 and 502-2, and reducing noise.

FIG. 6-3 illustrates a waveform 604 showing timing benefits of a scalable cascading MIMO automotive radar system, such as radar systems 102-1. Each of the transceivers 502-1 and 502-2 generates the LO-In signals 452-1 and 452-2. The combiner 602-1 combines the two signals 452-1 and 452-2 to create a combined signal that is input to the divider 602-2. The divider 602-2 supplies a common oscillating signal to each of the transceivers 502-1 and 502-2 respective LO-In 454. As shown by the waveform 604, there is a considerably less time delay (t2 minus t1) between a frequency-modulated chirp s0 produced by transceiver 502-1 and the frequency-modulated chirp s1 produced by the transceiver 502-2 as shown by waveform 504 in FIG. 5-3. As it is shown, after one frequency-modulated chirp, the common oscillating signal does not need time to reset and settle before the next frequency-modulated chirp can be generated, enabling quicker frequency-modulated chirps to be transmitted. Without the previous constraints of the LO signal, the length and bandwidth (BW) of a single chirp can be expanded or limited. Start frequency and slope for the second chirp is flexible. The shorter delay between chirps improves performance and enables a continuous sequence of chirps to be emitted.

Figures 1, 7:
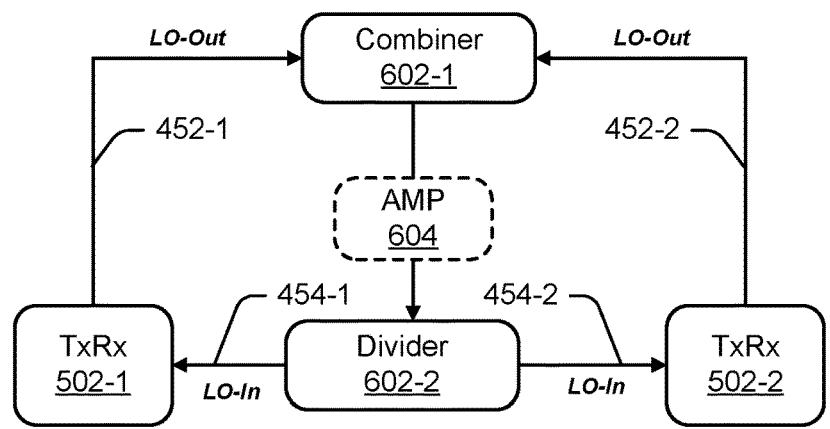
Figures 2, 7:
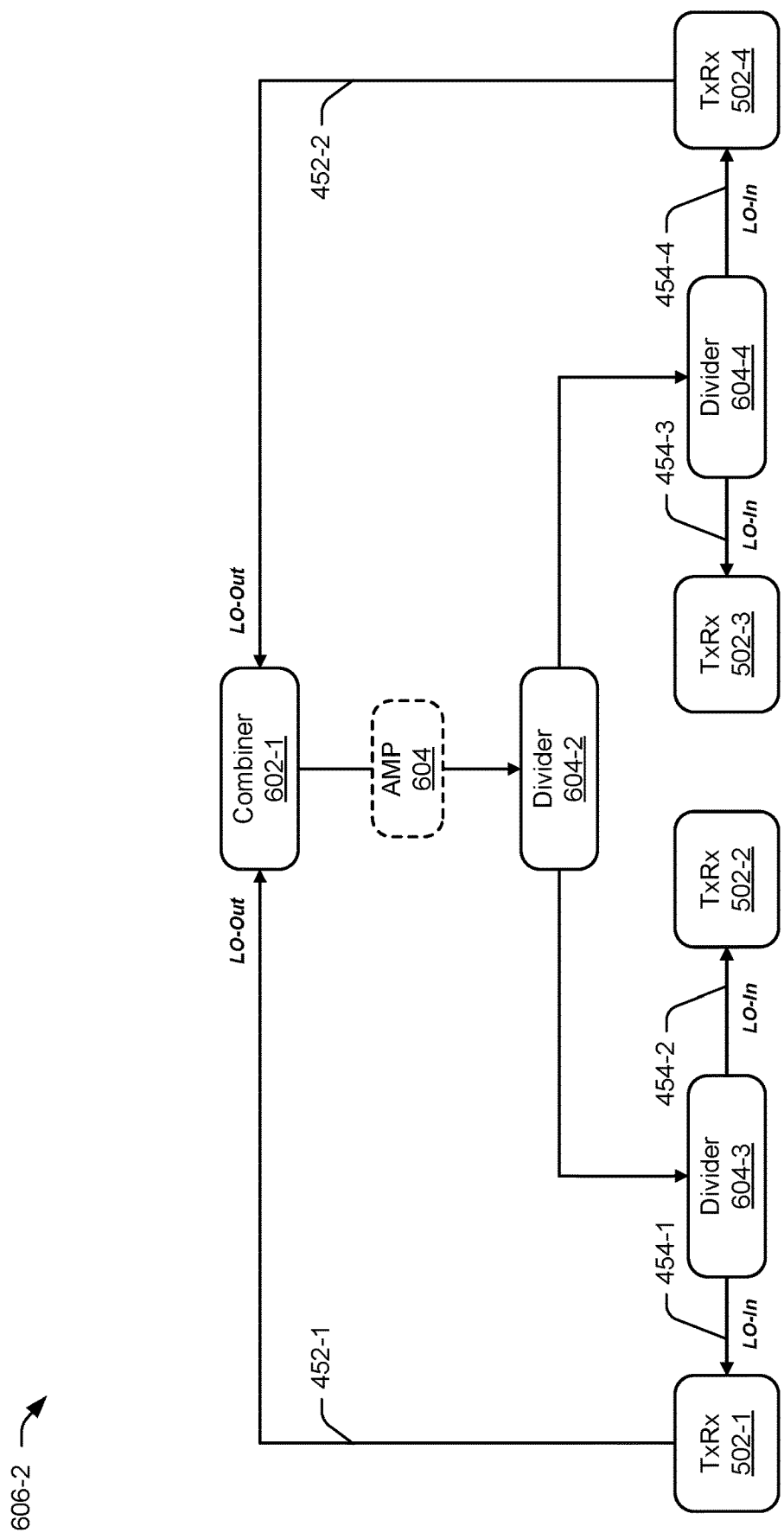
Figures 3, 7:
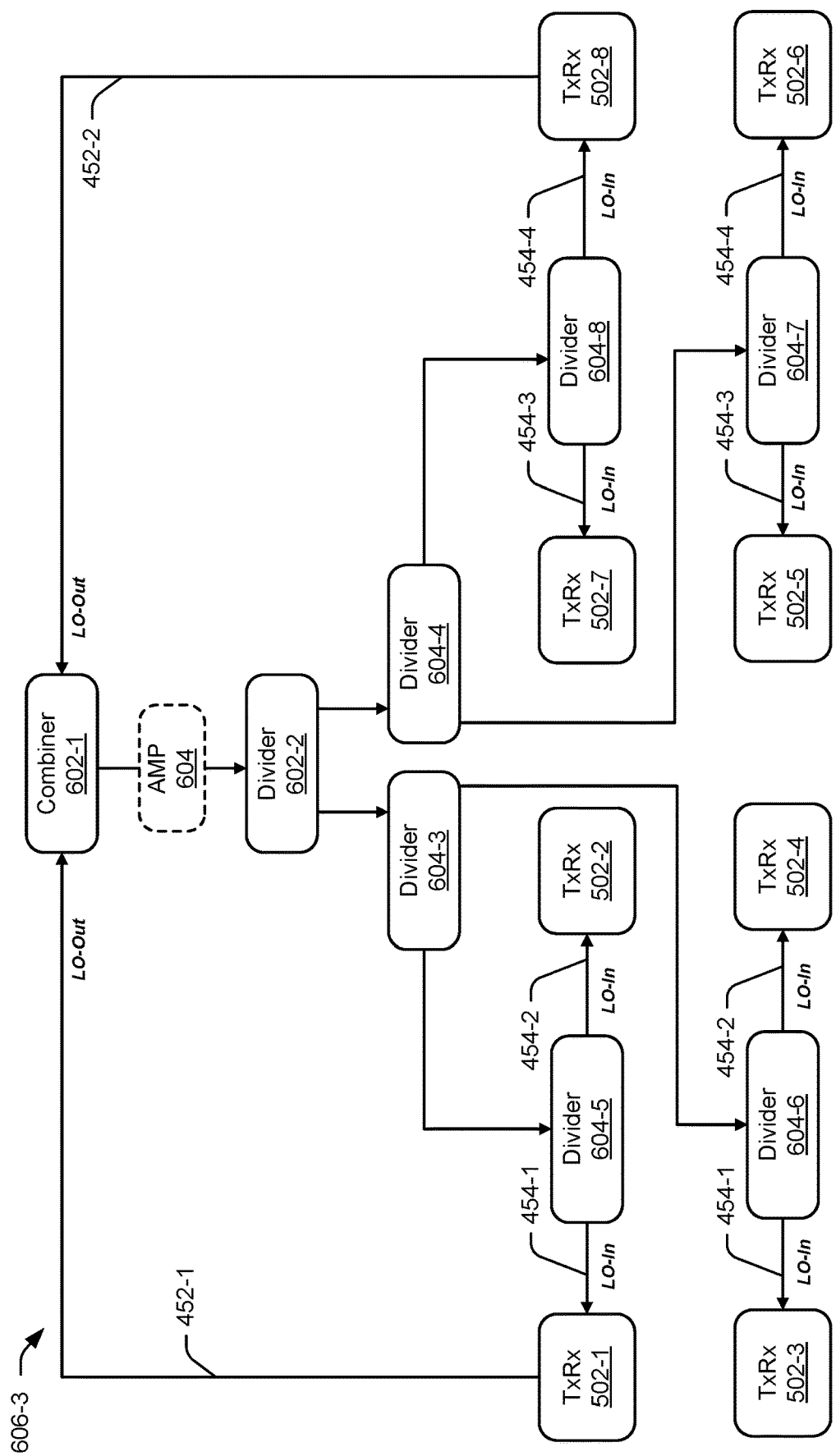
Figures 4, 7:
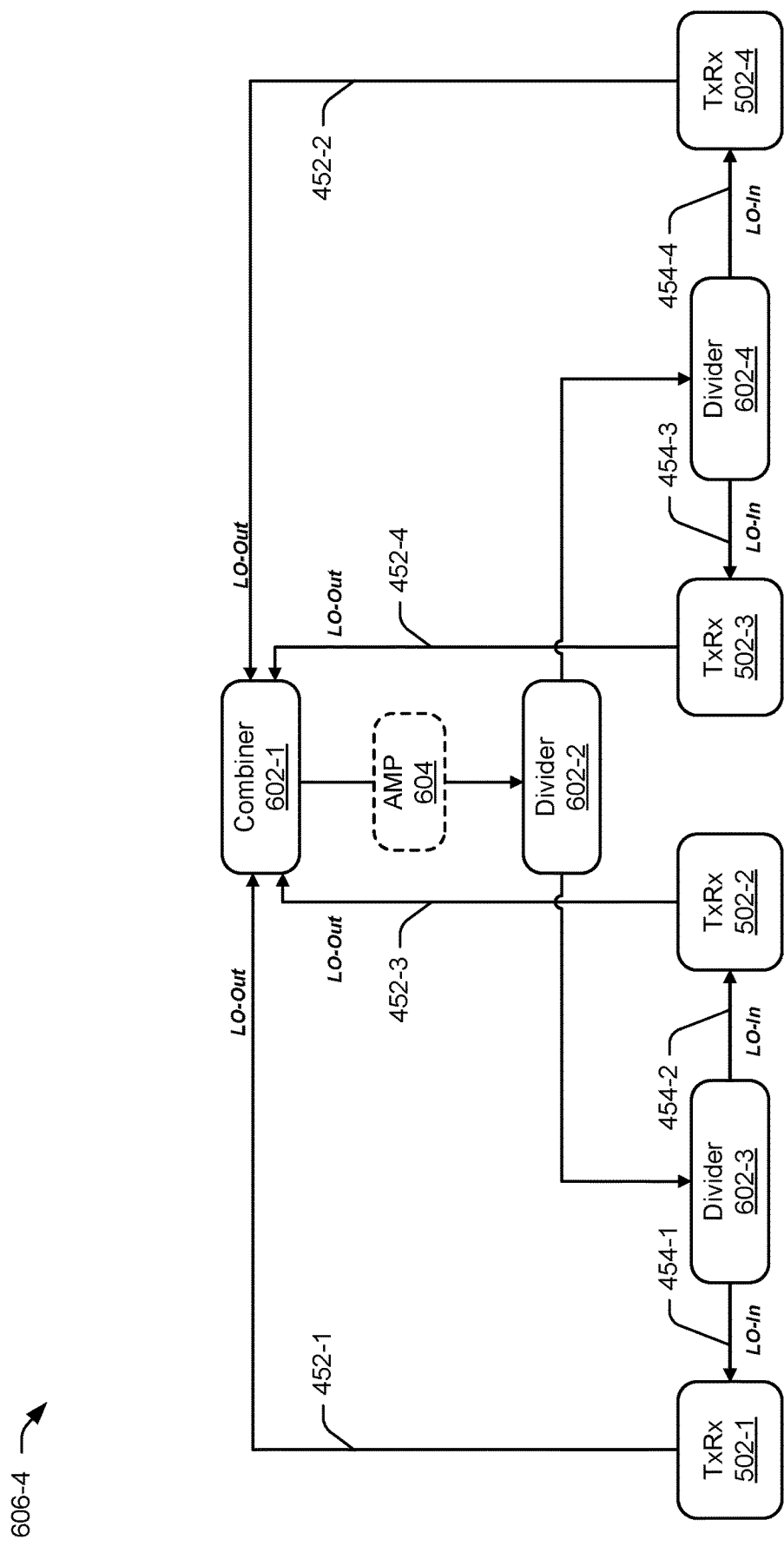

FIGS. 7-1 through 7-4 illustrate example transceiver architectures for a scalable cascading MIMO automotive radar system. The architectures 700-1 through 700-4 are examples of the architecture 606 from FIG. 6-1 where some or all of the LO signals are output and fed back to the system to be combined.

FIG. 7-1 shows the minimum components required to implement the example architecture 606. Architecture 606-1 includes a combiner 602-1 that receives as input a respective LO signal generated at LO-Out 452-1 of transceiver 502-1 and a different respective LO signal generated at LO-Out 452-2 of transceiver 502-2. The combined signals are received by the divider 602-2 as input and distributed as common oscillating signal input at LO-In 454-1 of transceiver 502-1 and at LO-In 454-2 of transceiver 502-2.

FIG. 7-2 shows an additional example of architecture 606-2, which includes a combiner 602-1 that receives as input a respective LO signal generated at LO-Out 452-1 of transceiver 502-1 and a different respective LO signal generated at LO-Out 452-2 of transceiver 502-4. The common oscillator signal is received by the divider 602-2 as input. However, there are additional transceivers in the example of 606-2. The common oscillator signal must reach the additional transceivers at the same time the common oscillator signal reaches the primary transceivers 502-1 and 502-4 to maintain the same phase. In other words, two levels of dividers 602-2 and 602-3 or 602-4 split (e.g., evenly) the LO signal received as input, so the LO signal that reaches the respective LO-In 454 of transceivers 502-1 through 504-4 arrive at approximately the same time.

FIG. 7-3 shows an additional example of architecture 606 from FIG. 6-1. FIG. 7-3 highlights how the architecture 600-3 is scalable for larger quantities of transceivers. Architecture 606-3 includes a combiner 602-1 that receives as input a respective LO signal generated at LO-Out 452-1 of transceiver 502-1 and a different respective LO signal generated at LO-Out 452-2 of transceiver 502-8. A common oscillator signal is output from the combiner 602-1 as input to a first level of division at the divider 602-2. The common oscillator signal is distributed to a second level of division at dividers 604-3 and 604-4 and then to a third level of division at either divider 604-5 or 604-6. The multiply divided common oscillator signal reaches all the transceivers respective LO-In 454 quickly and at approximately the same time.

FIG. 7-4 is a variation of the example architecture 606. In the architecture 606-4, more than two LO signals are combined by the combiner 602-1. Each of the transceivers 502-1 through 502-4 generates its own LO signal 452-1 through 452-4. The LO signals are combined into a common oscillator signal by the combiner 602-1. As such, the architecture 606-4 may ensure each of the transceivers 502-1 through 504-4 is synchronized to the common oscillator signal. The architecture 606 and each of the examples 606-1 through 606-4 allow multiple transceivers to be configured as primary transceivers and enable LO signals generated from multiple primary transceivers to be combined and shared to all primary and secondary transceivers.

Figure 8:
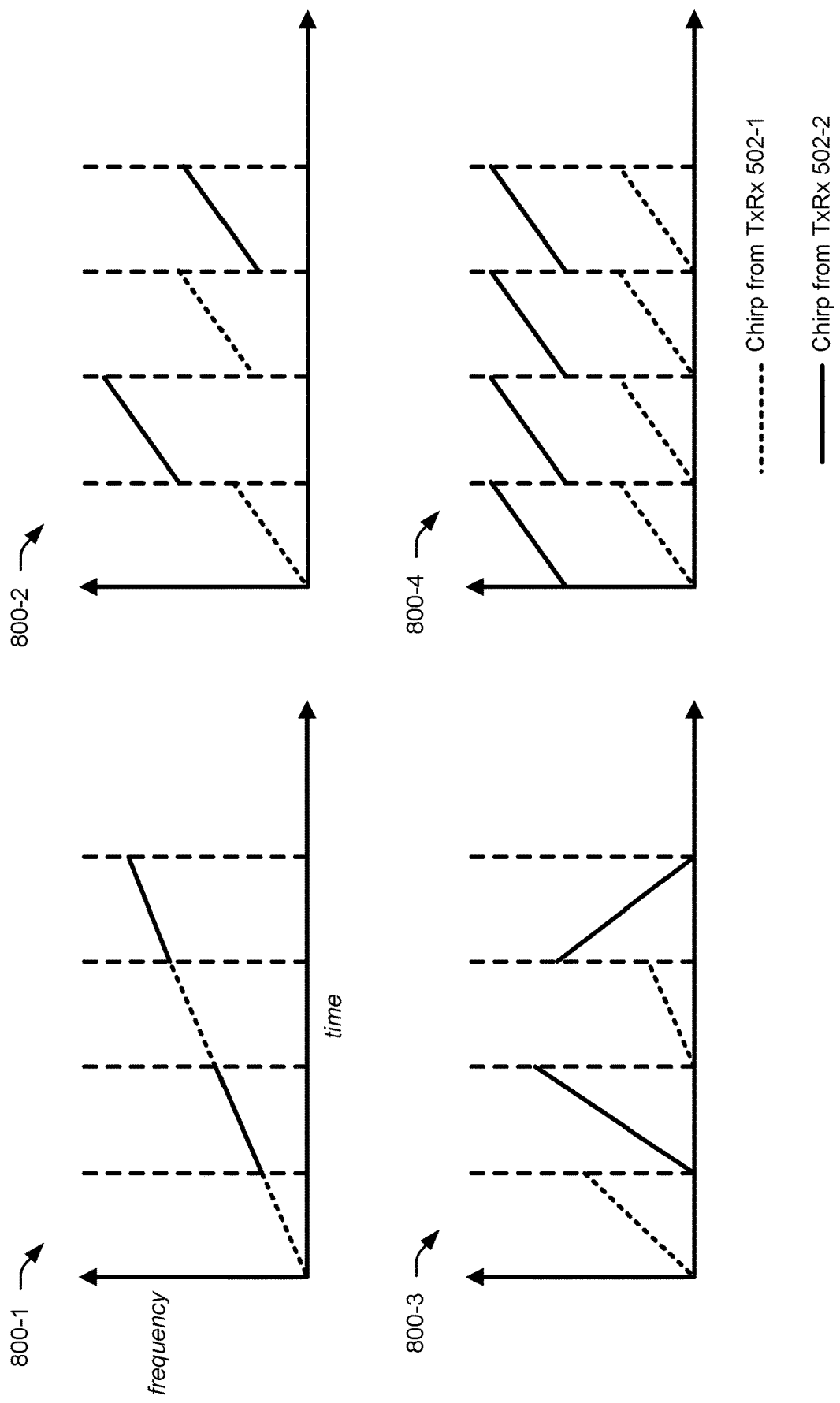
FIG. 8 illustrates example chirp waveforms of a scalable cascading radar system.

FIG. 8 illustrates example chirp waveforms 800-1 through 800-4 of a scalable cascading automotive radar system. FIG. 8 is described in the context of radar system 102-1 from FIG. 4-1. Waveforms that are different in time and frequency can be generated from one or multiple primary transceivers 104, which enables the generation of various waveforms that potentially get better performance in range resolution and Dopplercoverage, better orthogonality among TX channels, and are more robust to interference. For example, different LO signals from different primary transceivers 302-1 and 302-2 can be configured to operate sequentially in time to limit settling time and resetting time and lead to more precise waveforms. Quicker chirps enable more pulses to be transmitted during the same time frame, which leads to better performance for code-multiplexing and supporting more TX channels simultaneously. Different primary transceivers can output different (e.g., frequency) primary LO signals. When different LO signals are combined into a common oscillator signal, the radar waveforms may be emitted concurrently but at different frequencies to achieve larger bandwidth and better range resolution. Waveforms 800-1 through 800-4 are examples of different waveforms that are not possible with a single primary transceiver system but are made possible by a multiple primary transceiver system, such as the radar system 102-1.

As shown by waveform 800-1, for example, there is no delay between the chirps generated by transceivers 502-1 and 502-2. The waveform 800-1 shows how combining chirps with little delay between them enables a long chirp with large bandwidth. The waveform 800-2 highlights how eliminating propagation delay in the common oscillator signal enables a fast chirp pattern with random starting frequencies. Waveform 800-3 is an example of fast waveforms with different slopes, and waveform 800-4 illustrates dual-band chirps with same or different slopes.

Figure 9:
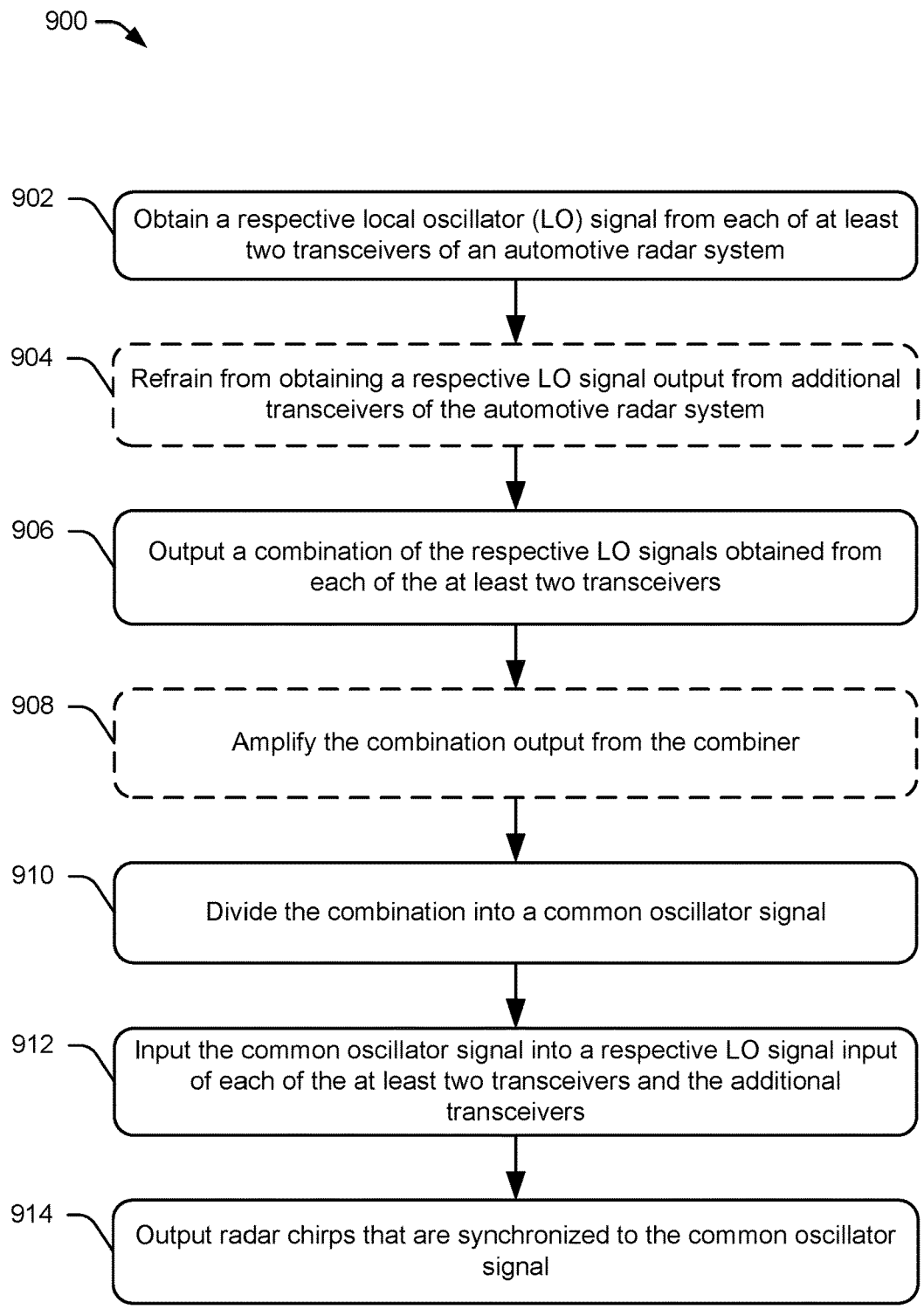
FIG. 9 illustrates an example method performed by a controller of a scalable cascading radar system.

FIG. 9 illustrates an example method 900 performed by a scalable cascading MIMO automotive radar system, such as radar system 102. For example, the processor 214 executes instructions associated with the radar control module 220 to configure the radar system 102 to perform the method 900. The method 900 includes steps 902 through 914. Method 900 is shown as sets of operations (or acts) performed but not necessarily limited to the order or combinations in which the operations are shown herein. Further, any of one or more of the operations may be repeated, combined, or reorganized to provide other methods. In portions of the following discussion, reference may be made to the environment 100 of FIG. 1 and to previous FIGS.

At 902, the combiner 602-1 obtains a respective LO signal 552-1 and 552-2 from each of the at least two transceivers 502-1 and 502-2 of the radar system 600-1. Optionally, at 904, the combiner 602-1 refrains from obtaining a respective LO signal output from additional transceivers. At 906, the combiner 601-1 outputs a common oscillator signal based on a combination of the respective LO signals 552-1 and 552-2. At 908, the amplifier 604 optionally amplifies the common oscillator signal prior to or subsequent step 910. At 910, the divider 602-2 divides the combination of the common oscillator signal into LO signal 554-1 and 554-2. The common oscillator signal is output as LO signal 554-1 and 554-2 simultaneously to each of the at least two transceivers 502-1 and 502-2 as well as any additional transceivers.

At 912, the common oscillator signal is input into a respective LO signal input 554-1 and 554-2 of each of the at least two transceivers as well as any additional transceivers. In other words, while inputting the common oscillator signal into a respective LO signal input 554-1 and 554-2 of each of the at least two transceivers 502-1 and 502-2, the common oscillator signal is input simultaneously into additional transceivers from which the LO signal output may not have been obtained. At 714, the radar processor 214 controls the transceivers 502-1 and 502-2 to output radar chirps that are synchronized to the common oscillator signal, including waveforms such as waveforms 800-1 through 800-4.

The following are additional examples of scalable cascading MIMO automotive radar system and applicable techniques.

Example 1. A scalable cascading automotive radar system comprising: a plurality of transceivers including a first transceiver and a second transceiver each configured to output a respective local oscillator (LO) signal; a combiner configured to merge the respective LO signal that is output from the first transceiver with the respective LO signal that is output from the second transceiver into a common oscillator signal; a divider configured to distribute the common oscillator signal to each of the plurality of transceivers when the transceivers are emitting radar signals for detecting radar reflections from targets outside an automobile; and a radar control component configured to output information associated with the radar reflections detected from the radar signals that reached the targets outside the automobile.

Example 2. The scalable cascading automotive radar system of example 1, further comprising an amplifier between the combiner and the divider, the amplifier configured to increase the common oscillator signal to a threshold level required by the plurality of transceivers for emitting the radar signals and detecting the radar reflections from the targets.

Example 3. The scalable cascading automotive radar system of example 1 or 2, further comprising an antenna configured to emit the radar signals and detect the radar reflections.

Example 4. The scalable cascading automotive radar system of any of examples 1 through 3, wherein the plurality of transceivers further include at least two additional transceivers that are each configured to receive the common oscillator signal.

Example 5. The scalable cascading automotive radar system of example 4, wherein the at least two additional transceivers are each configured to not output a respective LO signal.

Example 6. The scalable cascading automotive radar system of example 4, wherein the at least two additional transceivers is each configured to output a respective LO signal, and the combiner is configured to merge the respective LO signals from each of the first, second, and the at least two additional transceivers into the common oscillator signal.

Example 7. The scalable cascading automotive radar system of any of examples 1 through 6, wherein the divider is configured to evenly distribute the common oscillator signal to a respective LO signal input of each of the plurality of transceivers.

Example 8. A scalable cascading automotive radar system comprising: a plurality of transceivers each capable of outputting a respective local oscillator (LO) signal; a combiner configured to merge the respective LO signal that is output from at least two of the plurality of transceivers into a common oscillator signal; a divider configured to distribute the common oscillator signal to each of the plurality of transceivers when the transceivers are emitting radar signals for detecting radar reflections from targets outside an automobile; and a radar control component configured to output information about the radar reflections from the targets outside the automobile.

Example 9. The scalable cascading automotive radar system of example 8, wherein the combiner is configured to not merge the respective LO signal from at least two other transceivers of the plurality of transceivers.

Example 10. The scalable cascading automotive radar system of example 8 or 9, wherein the divider comprises multiple dividers configured to distribute an equal portion of the common oscillator signal output from the combiner to the respective LO signal input of each of the plurality of transceivers.

Example 11. The scalable cascading automotive radar system of any of examples 8 through 10, wherein the radar control component is further configured to: generate a first chirp with a first of the plurality of transceivers; and generate a second chirp with a second of the plurality of transceivers, the second chirp having a different frequency function over time than the first chirp.

Example 12. The scalable cascading automotive radar system of example 11, wherein the radar control component is further configured to: generate a third chirp with a third of the plurality of transceivers; and generate a fourth chirp with a fourth of the plurality of transceivers.

Example 13. The scalable cascading automotive radar system of example 12, wherein at least two chirps have respective frequency functions of time that are the same.

Example 14. The scalable cascading automotive radar system of example 12, wherein at least two chirps comprise respective frequency functions of time that are different.

Example 15. A method comprising: obtaining, from each of at least two transceivers of a scalable cascading automotive radar system, a respective local oscillator (LO) signal; generating, based on a combination of the respective LO signals output from the at least two transceivers, a common oscillator signal for input to the at least two transceivers when the at least two transceivers are emitting radar signals for detecting radar reflections from targets outside an automobile; and inputting the common oscillator signal into a respective LO signal input of each of the at least two transceivers when the at least two transceivers are emitting the radar signals for detecting the radar reflections from the targets outside the automobile.

Example 16. The method of example 15, further comprising: while inputting the common oscillator signal into the respective LO signal input of each of the at least two transceivers, simultaneously inputting the common oscillator signal into additional transceivers of the automotive radar system that do not output respective LO signals when the at least two transceivers are emitting the radar signals for detecting the radar reflections from the targets outside the automobile.

Example 17. The method of example 16, further comprising: refraining from obtaining the respective LO signals that are output from the additional transceivers.

Example 18. The method of any of examples 15 through 17, wherein generating the common oscillator signal for input to the at least two transceivers comprises: combining the respective LO signals of the at least two transceivers prior to dividing the combined respective LO signal into the common oscillator signal.

Example 19. The method of example 18, further comprising: amplifying the common oscillator signal prior to, or subsequent to, dividing the combined respective LO signal into the common oscillator signal.

Example 20. The method of any of examples 15 through 19, further comprising: detecting the radar reflections that are synchronized to the common oscillator signal.

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims.

What is claimed:
1. A radar system comprising:
a plurality of transceivers comprising respective local oscillators, the local oscillators of a first transceiver and a second transceiver of the transceivers configured to output respective local oscillator (LO) signals;
a combiner configured to combine the LO signals that are output from the local oscillators of first transceiver and the second transceiver into a common oscillator signal that is based on a combination of the LO signals that are output from the local oscillators of the first transceiver and the second transceiver;
at least one divider configured to distribute the common oscillator signal to the local oscillators of the transceivers when the transceivers are emitting radar signals for detecting radar reflections from targets outside an automobile; and a radar processor configured to output information associated with the radar reflections.

2. The radar system of claim 1, further comprising an amplifier between the combiner and the divider, the amplifier configured to increase the common oscillator signal to a threshold level required by the transceivers for emitting the radar signals and detecting the radar reflections from the targets.

3. The radar system of claim 1, further comprising a plurality of antennas configured to emit the radar signals and detect the radar reflections.

4. The radar system of claim 1, wherein:
the transceivers further include at least two additional transceivers; and
the local oscillators of the additional transceivers are configured to receive the common oscillator signal.

5. The radar system of claim 4, wherein the local oscillators of the additional transceivers are configured to not output LO signals.

6. The radar system of claim 4, wherein:
the local oscillators of the additional transceivers are configured to output respective LO signals; and
the combiner is configured to merge the LO signals output from the local oscillators of the first transceiver, the second transceiver, and the additional transceivers into the common oscillator signal.

7. The radar system of claim 1, wherein the divider is configured to evenly distribute the common oscillator signal to respective LO signal inputs of the local oscillators of the transceivers.

8. A radar system comprising:
a plurality of transceivers capable of outputting respective local oscillator (LO) signals;
a combiner configured to combine the LO signals that are output from at least two of the transceivers into a common oscillator signal that is based on a combination of the LO signals that are output from the at least two transceivers;
at least one divider configured to distribute the common oscillator signal to each of the transceivers when the transceivers are emitting radar signals for detecting radar reflections from targets outside an automobile; and
a radar processor configured to output information about the radar reflections.

9. The radar system of claim 8, wherein the combiner is configured to not merge the LO signals from at least two others of the transceivers.

10. The radar system of claim 8, wherein:
the transceivers comprise four or more transceivers; and
the divider comprises multiple dividers configured to distribute an equal portion of the common oscillator signal output from the combiner to each of the transceivers.

11. The radar system of claim 8, wherein the radar processor is further configured to:
cause a first chirp with a first of the plurality of transceivers; and
cause a second chirp with a second of the plurality of transceivers, the second chirp having a different frequency function over time than the first chirp.

12. The radar system of claim 11, wherein the radar processor is further configured to:
cause a third chirp with a third of the plurality of transceivers; and
cause a fourth chirp with a fourth of the plurality of transceivers.

13. The radar system of claim 12, wherein at least two of the first, second, third, or fourth chirps have frequency functions over time that are the same.

14. The radar system of claim 12, wherein the first, second, third, and fourth chirps comprise respective frequency functions of time that are different.

15. A method comprising:
obtaining, from at least two transceivers of an automotive radar system, respective local oscillator (LO) signals;
generating, based on a combination of the LO signals output from the transceivers, a common oscillator signal for input to the transceivers when the transceivers are emitting radar signals for detecting radar reflections from targets outside an automobile; and
inputting the common oscillator signal into respective LO signal inputs of the transceivers when the transceivers are emitting the radar signals for detecting the radar reflections from the targets outside the automobile.

16. The method of claim 15, further comprising:
while inputting the common oscillator signal into the respective LO signal inputs of the transceivers, simultaneously inputting the common oscillator signal into respective LO signal inputs of one or more additional transceivers of the automotive radar system.

17. The method of claim 16:
wherein the additional transceivers output respective LO signals; and
further comprising refraining from obtaining the LO signals that are output from the additional transceivers.

18. The method of claim 15, wherein the generating the common oscillator signal for input to the transceivers comprises:
combining the LO signals of the transceivers to generate a combined LO signal; and
dividing the combined LO signal into the common oscillator signal.

19. The method of claim 18, further comprising:
amplifying the common oscillator signal prior to, or subsequent to, the dividing the combined LO signal into the common oscillator signal.

20. The method of claim 15, further comprising:
detecting the radar reflections from the targets outside the automobile, wherein the radar signals are synchronized with the common oscillator signal.

* * * * *